United States Patent [19]

Braunlich et al.

[11] Patent Number: 5,015,855
[45] Date of Patent: May 14, 1991

[54] RADIATION DOSIMETRY BY COUNTING DIFFERENTIALLY IONIZED SAMPLE AREAS FROM HEAVY CHARGED PARTICLE EVENTS

[75] Inventors: Peter F. Braunlich; Wolfgang Tetzlaff, all of Pullman, Wash.

[73] Assignee: International Sensor Technology, Inc., Pullman, Wash.

[21] Appl. No.: 336,015

[22] Filed: Apr. 10, 1989

[51] Int. Cl.$^5$ ............................................... G01T 3/06
[52] U.S. Cl. .................................. 250/337; 250/327.2
[58] Field of Search ......... 250/337, 327.2 G, 484.1 B, 250/484.1 C, 486.1

[56] References Cited

U.S. PATENT DOCUMENTS

| | | |
|---|---|---|
| 3,457,408 | 7/1969 | Alter . |
| 3,577,161 | 5/1971 | Oberhofer et al. . |
| 3,975,637 | 8/1976 | Ikedo et al. .................. 250/327.2 |
| 4,179,614 | 12/1979 | Felice et al. .................. 250/253 |
| 4,484,073 | 11/1984 | Ohara et al. .................. 250/327.2 |
| 4,507,562 | 3/1985 | Gasiot et al. .................. 250/484.1 |
| 4,587,555 | 5/1986 | Carollo et al. .................. 358/111 |
| 4,638,163 | 1/1987 | Braunlich et al. .................. 250/337 |
| 4,733,090 | 3/1988 | DeBoer et al. .................. 250/484.1 |
| 4,825,084 | 4/1989 | Braunlich et al. .................. 250/484.1 |
| 4,839,518 | 6/1989 | Braunlich et al. .................. 250/337 |

OTHER PUBLICATIONS

Okamoto, Y. et al., "Thermoluminescent Sheets for the Detection of High Energy Hadronic and Electromagnetic Showers", *Nuclear Instruments and Methods, Phys. Res.*, A243, No. 1, pp. 219-224 (1986).

Cross, W. G. et al., "Background and Neutro Response of Electrochemically Etched CR-39", *Ninth DOE Workshop on Personnel Neutron Dosimetry*, (1982), pp. 38-43.

Faermann, S. et al., "Spectroscopy and Dosimetry of Fast Neutrons in the Energy Range (0.5-15) MeV Using CR-39", *Ninth DOE Workshop on Personnel Neutron Dosimetry* (1982), pp. 92-101.

Harvey, J. R. et al., "A Neutron Dosimetry System Based on the Chemical Etch of CR39", Berkeley Nuclear Laboratories, Berkeley, UK., *Fifth Symposium on Neutron Dosimetry*, EUR 9762 E1 (1985), pp. 519-529.

Chassende-Baroz et al., "Fast Neutron TL Dosimetry by Knock-On Protons: Energy Deposition in Thin Dosemeter Layers", *Radiation Protection Dosimetry*, vol. 17, pp. 119-112 (1986).

Yasuno, J. et al., "Feasibility of an X-Ray Imaging Method Using CsSO$_4$ Thermoluminescence Film", *Jpn. J. Appl. Phys.*, vol. 21, No. 6, p. 967 (1982).

Gasiot, J. et al., "Laser Heating in Thermoluminescence Dosimetry", *Journal of Appl. Phys.*, 53(7), pp. 5200-5209 (1982).

*Primary Examiner*—Jack I. Berman
*Assistant Examiner*—Richard Hanig
*Attorney, Agent, or Firm*—Wells, St. John & Roberts, P.S.

[57] ABSTRACT

Dosimeter reading methods and apparatus particularly useful in the measurement of heavy particle radiation dose exposure, such as from neutrons, protons, and alpha particles among others. The methods include exposing a dosimeter to a radiation environment to be measured. The dosimeter is thereafter stimulated, such as by a laser beam, to cause emission discharges from the dosimeter which are variable and indicative of the amount of ionizing radiation to which the element was exposed. Dosimeter elements which experienced an ionizing event from a heavy particle have higher levels of energy stored therein and produce higher luminescent or other emissions, thus characterizing that element or sample area as an eventful sample area. The number, portion or other measure of the eventful sample areas provides a basis for determining the level of radiation exposure due to the heavy particle or other discernable type of ionizing event. This allows the relatively uniform background radiation caused by gamma rays to independently be measured and the heavy particle radiation to be independently measured.

76 Claims, 10 Drawing Sheets

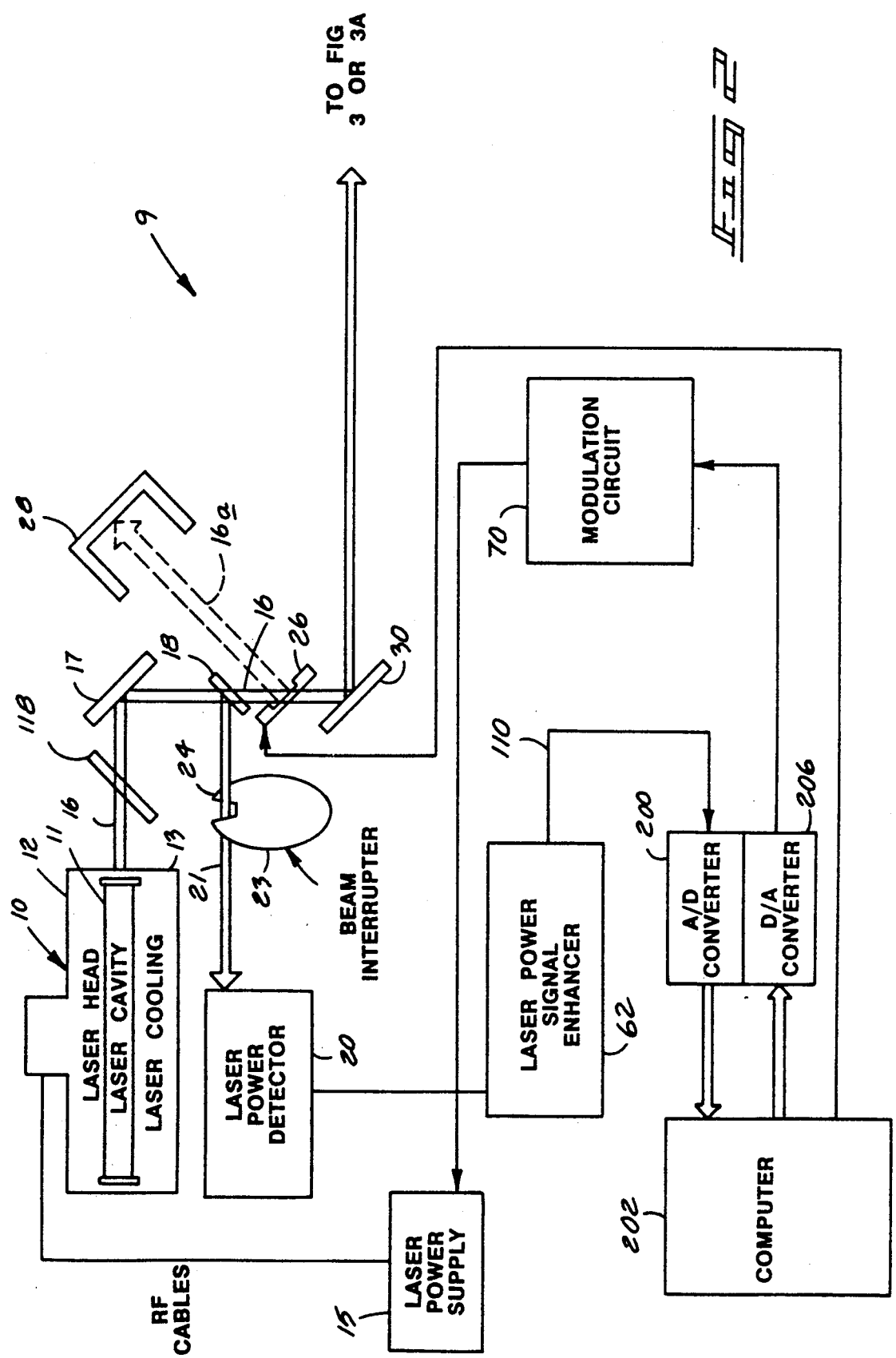

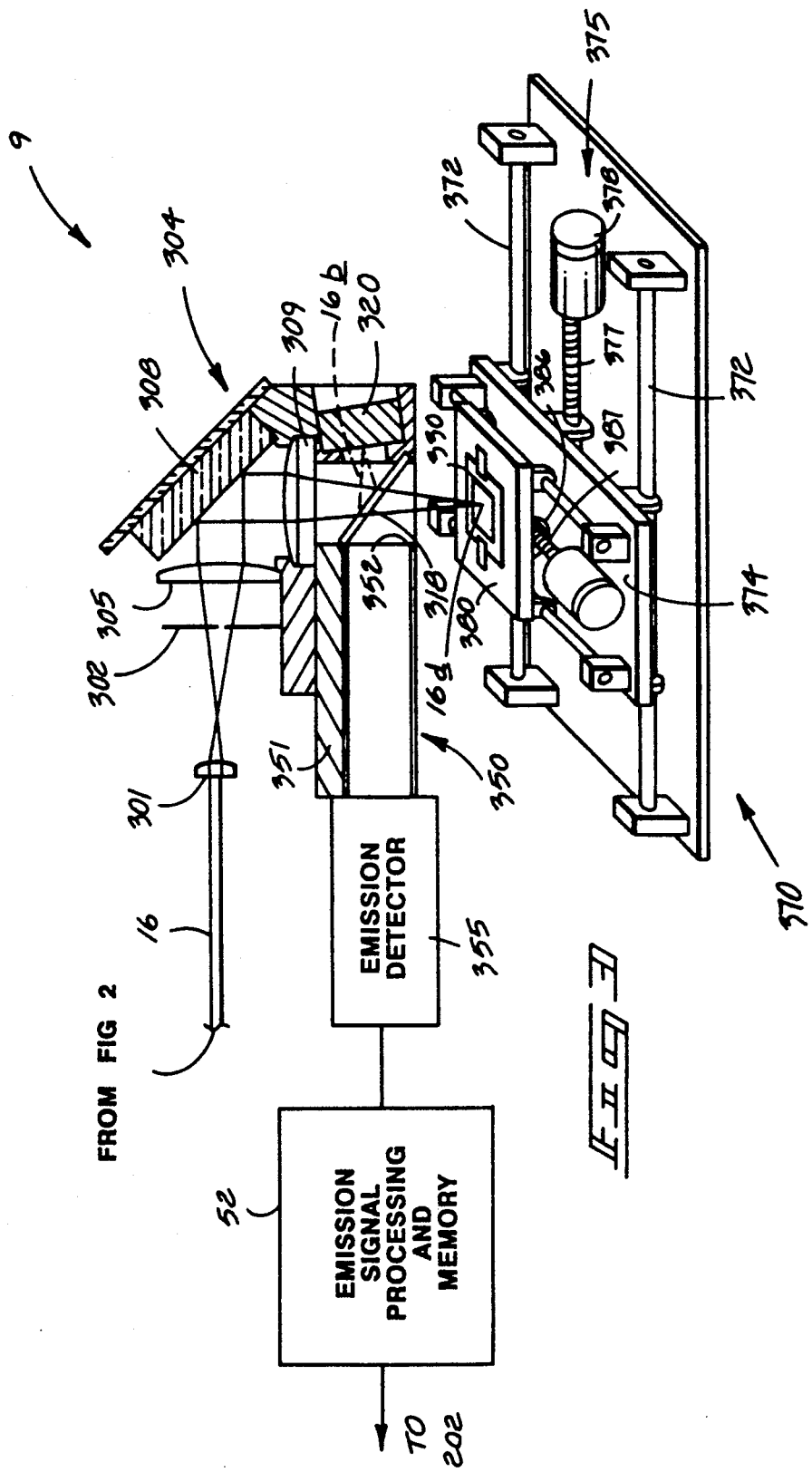

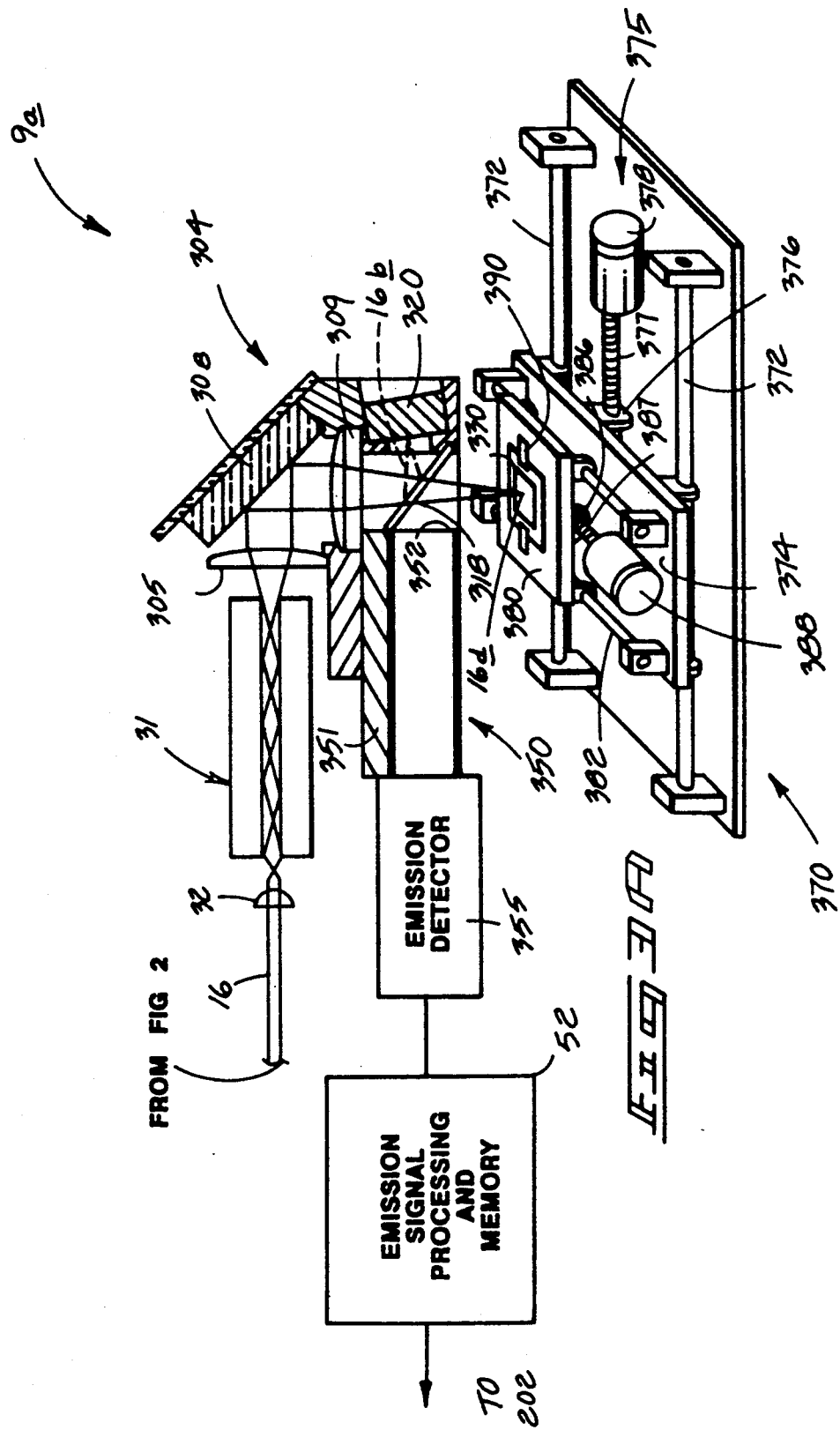

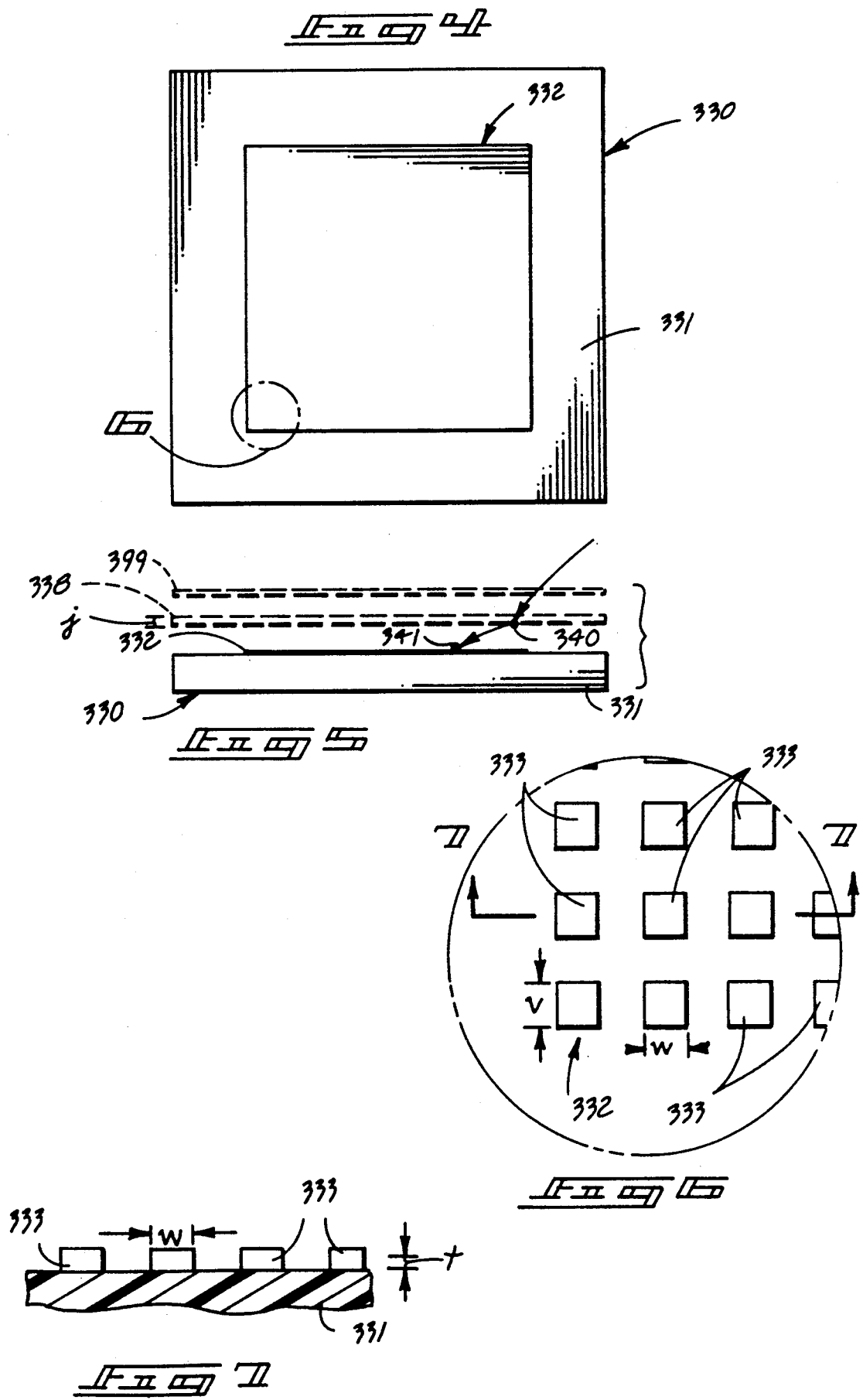

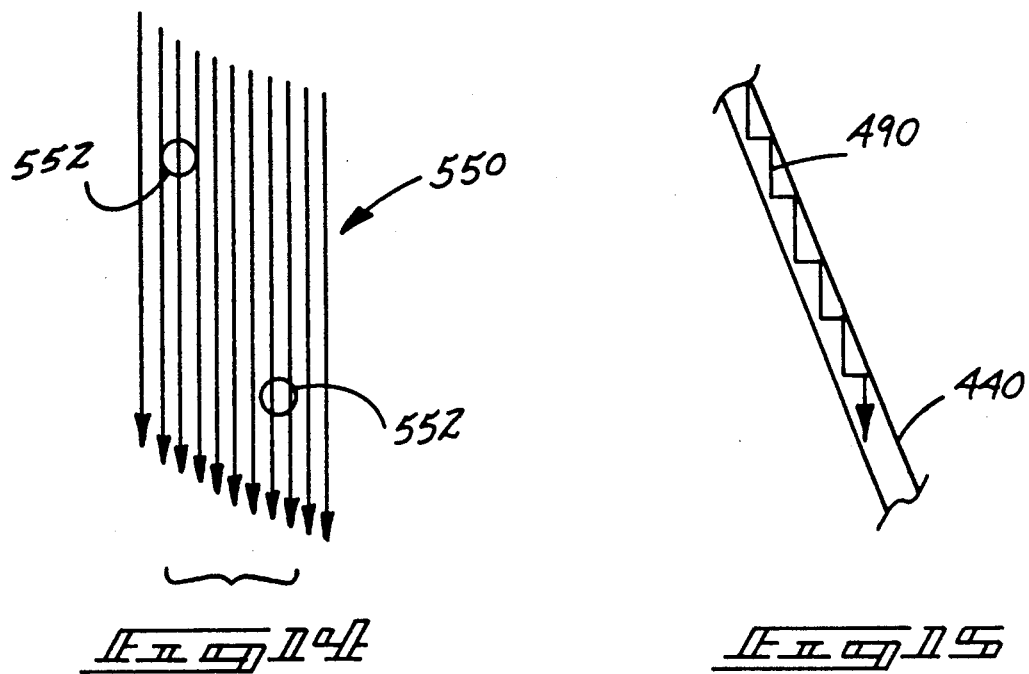
Fig 14
Fig 15
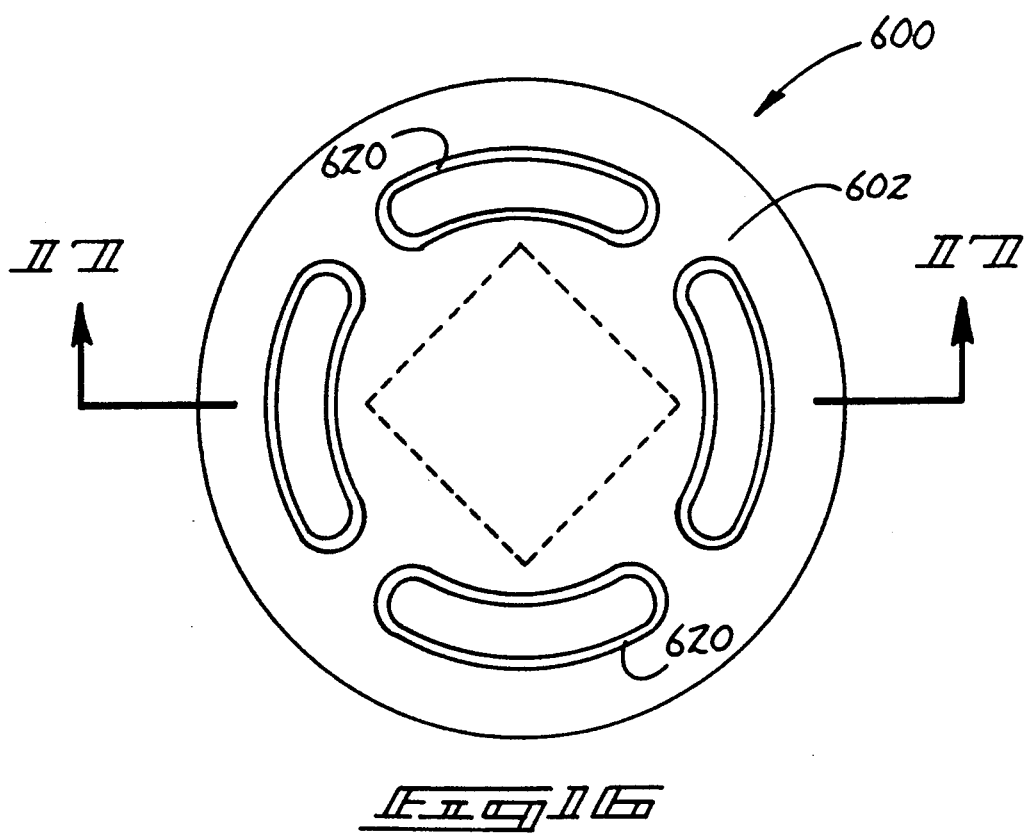
Fig 16

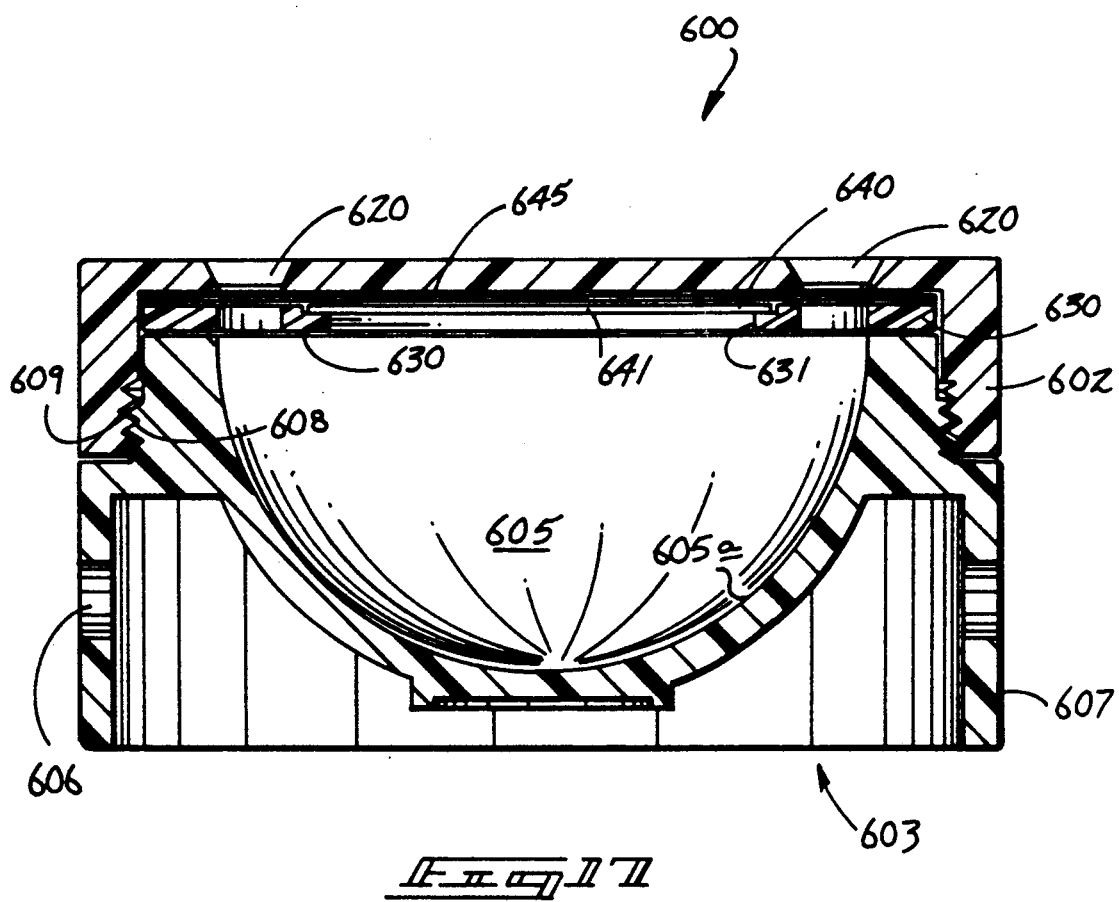

RADIATION DOSIMETRY BY COUNTING DIFFERENTIALLY IONIZED SAMPLE AREAS FROM HEAVY CHARGED PARTICLE EVENTS

This invention was made with government support under Contract No. N60921-88-C-0085 awarded by the U.S. Department of Defense. The government has certain rights in this invention.

CROSS-REFERENCE TO RELATED APPLICATIONS

This application is a continuation-in-part of allowed U.S. patent application Ser. No. 882,953, now U.S. Pat. No. 4,839,518, entitled "Apparatuses and Methods for Laser Reading of Thermoluminescent Phosphors", filed July 7, 1986 which was a continuation-in-part of U.S. patent application Ser. No. 652,829, filed Sept. 20, 1984 now U.S. Pat. No. 4,638,163, issued Jan. 20, 1987. This application is also a continuation-in-part of allowed U.S. patent application Ser. No. 897,992, now U.S. Pat. No. 4,825,084 entitled "Laser Readable Thermoluminescent Radiation Dosimeters and Methods for Producing Thereof", filed Aug. 19, 1986. All such applications and patent are a basis for priority under 35 USC §120 and are hereby incorporated by reference as if set forth in full.

TECHNICAL FIELD

This invention relates to dosimeter systems for measuring exposure to ionizing radiation, particularly radiation from heavy particles emitted from radioactive materials and other heavy particle radiation sources.

BACKGROUND OF THE INVENTION

The detection of relatively heavy particle radiation is often rendered more difficult by the presence of gamma rays within the radiation field being measured. It is common for nuclear reactors to emit both gamma radiation and energetic neutrons in varying proportions each having different radiation exposure effects. Although the presence of gamma rays is typically of interest in this situation and in other forms of personnel dosimetry, the component of total radiation exposure attributable to heavy particle radiation is often of independent interest. The desire to independently measure heavy particle radiation stems from the differing effects associated with it as compared to other radiation forms with which it can occur. Heavy particle radiation is also of independent concern because of variations in the sensitivity of measuring techniques to these differing forms of radiation, or because of other non-linearities which occur in dose measuring techniques which by intention or nature simultaneously detect combined gamma radiation doses and heavy particle radiation doses.

Similarly, the effective dose for purposes of personnel dosimetry for some forms of heavy particle radiation, such as from neutrons, is non-linear. Thus there is a need for a dosimeter and dosimeter reading system which selectively detects or measures the radiation so that the radiation dose information can be placed in a form indicative of the effective dose received by a person working or otherwise exposed to these forms of radiation. When one or more types of radiation are measured using a single dosimeter detector, then such non-linear dose versus measurement relationships complicate the measurement and interpretation of the dosimeter and can lead to indeterminate radiation doses not attributable to the type of radiation involved. Accordingly, in order to provide more accurate personnel radiation dose information it is necessary in many radiation environments to independently measure both of these radiation components.

Heavy particle radiation is for purposes of this document radiation associated with relatively heavy nuclear particles emitted during radioactive decay and other radiation producing processes and phenomena. Such heavy particles have a molecular weight of approximately 1 dalton or greater, and include particles such as neutrons, protons, heavier forms of mesons, alpha particles (helium nuclei), deuterons (nuclei of heavy hydrogen, deuterium) and other still larger nuclear particles emitted at energy levels generally in excess of approximately 10 keV or greater. Heavy particle radiation should be distinguished from light particle radiation or non-particulate rays such as electrons, neutrinos, and gamma rays, and others which have masses of zero, near zero, or at most two orders of magnitude less than 1 dalton.

Heavy particle radiation can occur as heavy charged particles, such as protons, alpha particles, deuterons, some forms of mesons, and other relatively heavy nuclei or nuclear components which have been emitted without sufficient associated electrons to maintain a neutral electrical charge. Heavy particle radiation can also occur in the form of uncharged heavy particles such as neutrons, and some types of heavy mesons. Heavy particle radiation is typically of greater interest from a personnel dosimetry monitoring standpoint when the particles are ionizing radiation. In general, neutral particles such as neutrons do not themselves directly cause ionization because they are neutral bodies and do not cause electrons to be displaced as they strike tissue or other materials of interest. However, personnel dosimetry for neutrons is still important because energetic neutrons interact with hydrogen containing molecules to emit energetic protons which are ionizing radiation, the effects of which are dependent upon the energy levels of the stimulating neutrons and the protons being radiated thereby.

Prior systems for monitoring neutron radiation exposure have typically had difficulty measuring over a broad dynamic range of radiation levels in a manner which tracks the dose equivalency of the radiation. FIG. 1 shows a dose equivalency curve for personnel (human) neutron radiation dosimetry. This figure indicates that below 10 keV the energy level of the neutrons is of little significance in determining the effective dose for purposes of measuring radiation exposure. At neutron energy levels above 10 keV the increasing energy level of the neutrons has an increasing effect on human tissue and should be reflected in the radiation dose measurement to provide accurate assessment of radiation exposure. This increasing effect of neutron energy level increases up to energy levels of approximately 1 MeV where the curve essentially levels off and the effects of increasing neutron energy are not significant for personnel radiation dose monitoring purposes.

A number of approaches have been used to try and compensate for the non-linear relationship between effective neutron dose and the variations in measuring neutron radiation using different detection techniques. In one dosimeter design by Harvey a lithium fluoride dosimeter using a pair of dosimeters of phosphor types TLD-600 and TLD-700 were mounted in a 4.8 centimeter polyethylene sphere in an effort to match the dose responsive curve indicated in FIG. 1, for neutrons up to energy levels of 10 keV. Harvey indicated that an appropriately designed neutron to knock-on proton converter might meet the dose equivalency requirements above 10 keV, if a detector could be found which provides sufficient proton detection sensitivity down to energy levels of 10 keV. The only current technology which approaches this level is the C39 polycarbonate track etch dosimeter which does not demonstrate proton detection sensitivity sufficient to meet this minimum threshold. Current techniques for electro-chemical etching of the C39 polycarbonate dosimeters provide lower sensitivity thresholds in the 100–300 keV range.

A number of dosimetry systems are in use which combine albedo and track etch methods. The most sophisticated of these appears to be the Karlsruhe system which employs a 3 millimeter thick boron-loaded encapsulation for a pair of TLD-600 and TLD-700 lithium fluoride chips to provide albedo, reflected, radiation detection. These dosimeter elements are combined with Macrofol (polycarbonate) track etch dosimeters. The boron shield for this dosimeter has small collimating holes on the side which faces the body of the wearer to reduce the dependence of the dosimeter to body distance. Although these dosimeters represent the best available technology they still do not provide the desired level of accuracy in measuring heavy particle radiation as distinct from gamma radiation. They further do not provide the desired level of sensitivity to minimum energy levels for heavy particle radiation.

Of still further significance is the fact that these and other track etch dosimeters do not provide any variation in the measured dose dependent on the energy level of the heavy particle. Instead the track etch dosimeters all suffer from the very significant limitation that a heavy particle is either sufficiently energetic to cause a track to be identified or not. Once this sensitivity threshold is surpassed there is no practical ability to discern the energy level of the particle. This severely limits the potential accuracy of the track etch techniques and indicates the continuing need for dosimetry systems for heavy particles which can provide at least some indication of the relative heavy particle energy level of the radiation received during the exposure period.

It is also noteworthy that track etch detectors in general are insensitive to gamma rays. Although this property of these detectors is beneficial in selectively detecting heavy ionizing particles, it requires that a distinct dosimetric detector be included in any dosimeter or dosimeter badge used in personnel dosimetry where gamma rays also need to be measured. Since there is typically at least some risk from gamma radiation in almost all situations where personnel dosimetry is used, this necessitates more complex dosimeter configurations having at least two detector types to monitor both types of radiation. This in turn requires the manufacture of both dosimeter elements and assembly of both in a dosimeter element holder or badge. The reading of the dosimeter further requires that both dosimeters be read. If the technologies of the two or more dosimeter elements is different, then different laboratory or other dosimeter reading facilities must be used for each of the different dosimeter technologies used in each badge. This necessarily increases the cost of processing and reading the dosimeters. Accordingly, there are distinct advantages associated with dosimeter systems which can derive relatively independent measurements of two types of radiation, such as heavy particle radiation and gamma radiation, using a single dosimeter and dosimeter reading apparatus. It is even more preferable if such reading can be accomplished in a single reading operation.

The technologies employing chemical track etch dosimeters are further burdened by the required lengthy and costly treatment of the detectors in concentrated caustic solution to etch the radiation tracks into the polycarbonate or other track etch media used in the dosimeter detector. This disadvantageous and dangerous etch processing is exacerbated in electrochemical etching by the electrical shock hazard associated with using applied etching potential of up to 2000 volts. These hazards require special laboratory facilities capable of safely handling these processes which make many desired on-site dosimeter reading applications impractical. Because of these factors, track etch dosimeters are not acceptable for a number of important applications in personnel radiation dosimetry.

In addition to personnel monitoring there are other situations in which the level of heavy particle radiation is preferably measured without the potential or actual effects associated with gamma rays or other forms of non-heavy particle radiation. For example, in the detection of radon gas there is typically simultaneous exposure of the radiation detector to both gamma rays and the alpha rays which most appropriately indicate the decay of radon. Thus the person seeking to measure radon levels using a detector which is not selective to alpha particles versus gamma rays is confronted with the potentially erroneous effects of the gamma rays.

Current techniques for measuring radon gas include charcoal packets and canisters. These detectors saturate after only a few days of air sampling. They also rely on indirect gamma radiation rather than direct detection of alpha particles which are more accurate indicators of radon concentration. They further require up to one hour of laboratory measurement time with a scintillation counter to determine the radon concentration of the air sampled by the detector. The relatively smaller "tea-bag" type carbon packets absorb radon so rapidly that equilibrium is reached in less than a day. Conversely, these small detection packets have high rates of desorbtion which cause the resulting measurements to change significantly dependent upon how long it takes to transmit the packet from the sampling area to the laboratory where the measurements are actually taken. Thus there is good reason to doubt whether these widely-used forms of radon dosimetry are providing accurate measurement of radiation levels for the buildings and homes where they are commonly being used as radiation detectors. Since substantial investment decisions are routinely being made concerning purchase or remedial measures based upon these tests there is a substantial need for better dosimetry systems for measuring radon levels.

The above explanation provides an indication of the continuing need for improved dosimetry systems for heavy particle radiation, particularly neutron, proton and alpha particle radiation. Still further there remains a need for reliable, economical, and accurate radiation dosimetry systems which are capable of measuring heavy particle radiation exposure. There is also a need for such dosimetry systems which can utilize reusable dosimeter detectors which are easily read without costly laboratory procedures.

BRIEF DESCRIPTION OF THE DRAWINGS

Preferred embodiments of the invention are illustrated in the accompanying drawings which are briefly described below.

FIG. 2 is a diagrammatic representation of a preferred dosimeter reading apparatus according to this invention.

FIG. 3 is a further diagrammatic representation of additional portions of the dosimeter reading apparatus shown in FIG. 2.

FIG. 3A is a diagrammatic view of an alternative embodiment showing portions similar to the portions shown in FIG. 3 with an additional beam equalizer component shown.

FIG. 4 is a top or plan view of a dosimeter according to this invention.

FIG. 5 is a front edge view of the dosimeter shown in FIG. 4 with optional proton radiator and filter shown in phantom superimposed over the dosimeter.

FIG. 6 is a partial enlarged plan view of the dosimeter of FIG. 4 taken substantially at detail circle 6 of FIG. 4.

FIG. 7 is a sectional view taken along line 7—7 of the enlarged dosimeter portions shown in FIG. 6.

FIG. 14 is a partial enlarged plan view of portions of the dosimeter of FIG. 13 with alignment means incorporated thereinto.

FIG. 15 is an enlarged view of the dosimeter of FIG. 8 showing a possible laser beam scanning trajectory along a dosimeter stripe.

FIG. 16 is a top view of a preferred dosimeter holder and dosimeter for use in measuring radon gas concentration by alpha particle counting utilizing technology according to this invention.

FIG. 17 is a sectional view taken along line 17—17 of FIG. 16.

DETAILED DESCRIPTION OF THE PREFERRED EMBODIMENT

Figure 1:
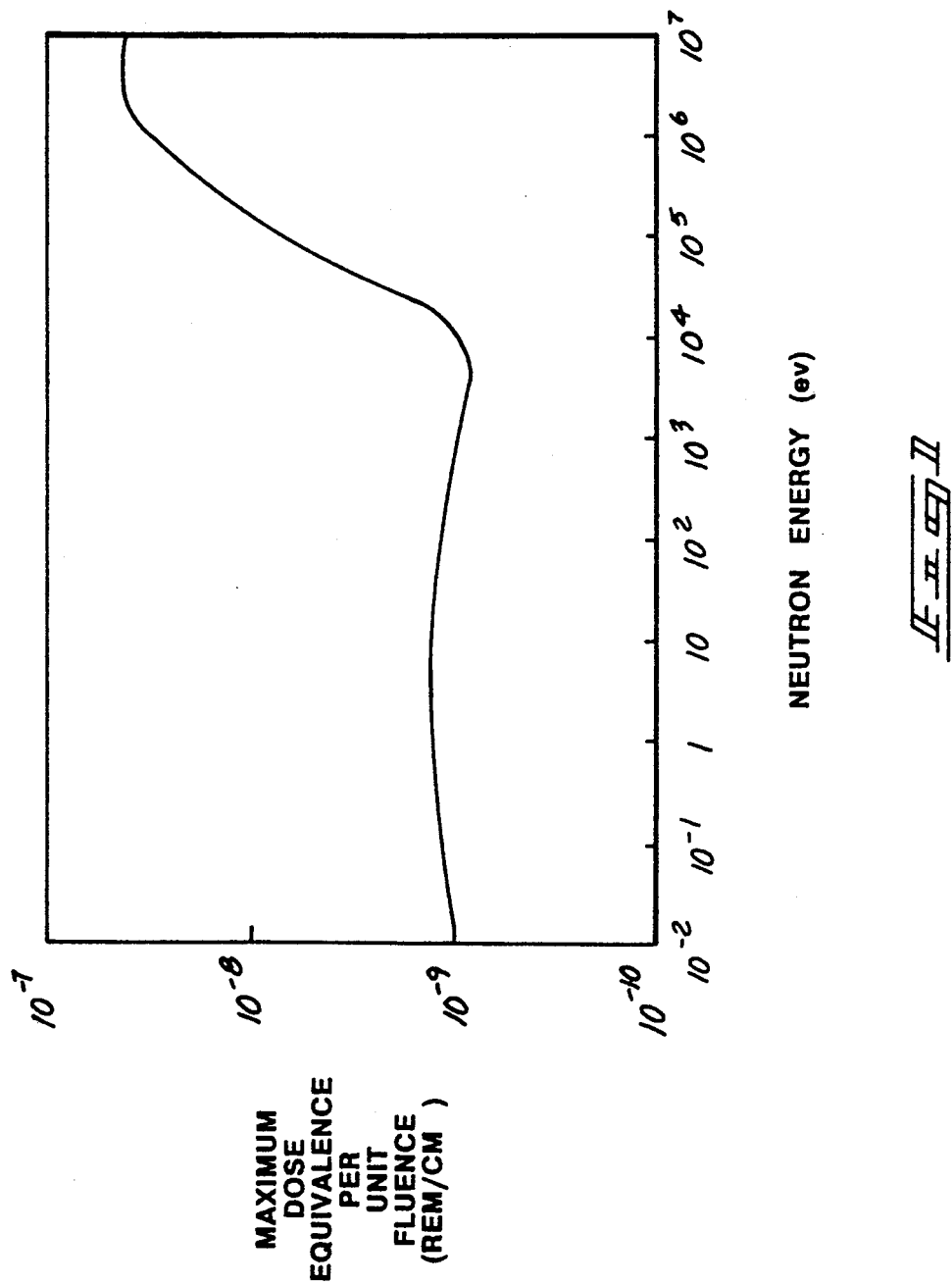
FIG. 1 is a graph showing the preferred relationship for relating dose equivalency of neutron radiation as a function of varying neutron energy level of such radiation.

The following disclosure of the invention is submitted in compliance with the constitutional purpose of the Patent Laws "to promote the progress of science and useful arts" (Article 1, Section 8).

FIG. 2 shows a portion of a preferred laser dosimeter or phosphor reading apparatus 9 according to this invention. Dosimeter reading apparatus 9 is similar in construction to the phosphor reading apparatuses described in the incorporated by reference U.S. patent application Ser. No. 882,953, specifically at pages 8–33 and associated Figs. Description will now be made to the principle components of dosimeter reader 9. Specific reference will not be made to particular electronic components which are adequately described in the incorporated patent application referred to in this paragraph.

Dosimeter reader 9 includes a laser beam source means 10 which generates a suitable laser beam 16 for use in stimulating the particular type of phosphor or other radiation sensing and storing material used to detect the radiation dose. The laser beam source 10 can be a laser, such as a wave guide or non-wave guide laser of desired stimulating frequency or wavelength. When the dosimeter being read uses a thermoluminescent phosphor a suitable type of laser is preferably an infrared carbon dioxide ($CO_2$) laser having an approximate wavelength of 10 micrometers. Other lasers having beams in the infrared and visible ranges of the electromagnetic spectrum can alternatively be used. When the dosimeter dose storage material or phosphor is of a type suited for optically stimulated luminescent emission then a higher frequency laser, such as a dye laser having an approximate wavelength of 1 micrometer is preferably used as laser source 10. Laser having wavelengths of 0.1-1 micron are alternatively possible, as are other lasers providing beams in the ultraviolet range of the electromagnetic spectrum. Optically stimulated luminescence and the reading of phosphors using optically stimulated luminescence is explained in greater detail in U.S. Pat. No. 4,507,562, entitled "Method For Rapidly Stimulating Luminescent Phosphors and Recovering Information Therefrom", issued Mar. 26, 1985 which is hereby incorporated into this document by reference in its entirety.

Laser source 10 advantageously includes a laser head 12 having a laser cavity 11, and preferably a laser cooling and temperature stabilization unit 13. Cooling and stabilization unit 13 helps to maintain the laser beam 16 within an acceptable range of frequency or wavelength output. Laser head 12 is powered by an electronic laser power supply 15. Laser head 12 and laser power supply 15 are preferably selected to allow modulation of the laser power output. The preferred modulation is pulse width modulation at radio frequencies as explained in greater detail in the incorporated U.S. patent application Ser. No. 882,953. A suitable laser is Model B48-1-115 from Synrad, inc., having a modulation frequency of 30 kHz.

The preferred laser source includes suitable means for providing a fixed orientation polarized laser beam 16. The polarizer or other equivalent polarization means is preferably incorporated into the laser source, but can alternatively be provided in the form of an initial optical polarizing element 118 which is not incorporated into the laser. Fixed polarization is desired because the mirrors and other optical elements typically have some variations in reflectance or other optical properties which vary dependent upon the polarization orientation of the laser beam 16.

The emitted laser beam 16 is advantageously directed using any desired mirror arrangement as the particular arrangement of the dosimeter reader suggests or requires. FIG. 2 shows an arrangement utilizing two mirrors 17 and 30. The mirrors are most preferably gold coated copper mirrors having a flat reflective surface.

FIG. 2 also shows a beam splitter 18 which allows most of the laser beam to continue therethrough, but reflects a detector beam 21. The beam splitter 18 can advantageously be a zinc selenide window having anti-reflection coating on one side. The uncoated face is used to reflect the detector beam 21. The beam splitter is preferably made with non-parallel faces to prevent coincident interfering reflections from being directed to a laser power detector 20 from both faces of the beam splitter.

Detector beam 21 is directed through a beam interrupter, such as a chopping wheel 23 with one or more apertures 24, and then to the laser power detector 20. The chopping wheel or other beam interrupter is needed when the laser power detector performs better with an intermittent detector beam. When laser power detectors are used which can continuously monitor the beam, then no beam interrupter is needed. A preferred type of laser power detector is a pyroelectric detector having a lead zirconate titanate detector element available from Barnes Engineering, Div. of EDO Corporation, Model 350-2. Such a pyroelectric detector is preferably used with a beam interrupter. An alternative arrangement and type of laser power detector is also shown in connection with FIG. 3 and is described below.

The laser power detector produces an electronic output signal which is communicated to a laser power signal enhancer 62 to improve the signal's characteristics. The resulting enhanced signal is communicated to an analog-to-digital (A/D) converter 200 which produces a digital signal representative of the laser power level at particular measurement points in time, dependent upon the output signal of the laser power detector and the frequency rate at which the A/D converter scans it's input signal from the laser power signal enhancer 62.

The digital laser power signal from A/D converter 200 is communicated to a computer or other digital controller 202. The computer preferably stores information indicative of the laser power with time. Computer 202 also processes the digital laser power signal from converter 200 relative to a desired and adjustable laser power level which is programmed into the computer. The comparison of the measured laser power level against the predetermined laser power level target produces a power control output signal which is suitably processed, such as through a digital-to-analog converter 206. Converter 206 provides an analog laser power control signal which is communicated to a modulation circuit 70. Modulation circuit 70 outputs a modulation signal which is communicated to laser power supply 15 in order to control the power of the laser beam 16 output from laser source 10.

The laser power modulation and control system just described allows the instantaneous power level of the laser beam to remain at a desired level. The desired laser power level can remain constant or vary during the heating or other reading or stimulating cycle to best stimulate and extract the dose exposure information.

As shown, laser beam 16 is controlled by an exposure shutter 26 which is downstream from the beam splitter 18. Alternatively, exposure can be controlled by turning the laser source on and off. Any exposure shutter can be of a variety of types, and is preferably provided with an electrically controlled shutter actuator to enable computer 202 to control the shutter and resulting exposure of the dosimeters to the laser beam. The reflected laser beam 16a from the shutter when closed is preferably dissipated in any suitable beam dump 28. The controlled laser beam emitted from the shutter when open is supplied directly to remaining parts of the system or beamed against the second mirror 30 to provide the desired position, orientation and adjustment capability.

FIG. 3 shows additional portions of the preferred dosimeter reading apparatus 9 according to this invention as adapted to carry out the novel methods of the invention. FIG. 3 indicates that the shutter controlled laser beam is preferably passed through a short focal length focusing lens 301 which directs the beam toward an optional aperture means 302. Lens 301 is advantageously constructed of zinc selenide when transmitting the approximately 10 micron wavelength laser beam used in the thermoluminescent dosimeter reading applications among those contemplated by this invention. Focusing lens 301 preferably converges the beam to a focal point from which the beam diverges toward any aperture means. Aperture means 302 is a non-transmissive plate having preferably one opening or aperture which can be suitable configuration, such as a circular hole (as shown), circular annular ring (not shown), or other suitable configurations. Aperture means 302 is included to reduce the amount of the laser power and/or to minimize the beam size.

FIG. 3A shows an alternative form of dosimeter reader 9a which is very similar to the embodiment of FIG. 3 with the addition of an optical equalizer means 31 in the form of a reflective optical channel 34. The laser beam is directed into the channel through lens 32 which diverges the beam into the channel. In the channel the beam is reflected and equalized. The beam emitted from the channel is of more uniform laser power density and can be used for dosimeters not requiring very small laser beam focusing.

Referring to either FIG. 3 or FIG. 3A, the beam emitted from the aperture 302 is preferably directed onto a dosimeter being read, such as dosimeter 330, using a suitable beam imaging subsystem 304. Imaging subsystem can be arranged in various ways. As shown, imaging subsystem 304 includes a first imaging lens 305 which receives the beam emitted from any aperture means 302 or equalizer 31. Lens 305 is preferably selected to receive the diverging beam and refract the beam to provide preferably parallel beam rays. The substantially parallel or other suitable beam from lens 305 is reflected from an imaging mirror 308. The reflected beam from mirror 308 is advantageously passed through a second imaging lens 309 which focuses the beam for minimum beam size as the beam impinges on the dosimeter 330. The relatively small beam size allows for finer resolution and limited stimulation of the phosphor to enhance the novel methods described hereinafter. A suitable beam size is approximately 50 microns in diameter as explained more fully below.

The dosimeter reader can also be adapted to accommodate a laser power detector 320 and related components near the beam imaging subsystem. Such laser power detector functions in substitution to laser power detector 20 or in addition thereto to provide increased potential for accurate laser power control. Laser power detector 320 receives and measures the intensity of a partially reflected detector beam 16b which is split from the main laser beam by beam splitter 318. Beam splitter 318 is similar to beam splitter 18 described above. Laser power detector 320 is shown as a laser power detector which can continuously monitor without the need for a beam interrupter, such as chopping wheel 23. A suitable type of continuous laser power detector is a photoconductor, such as a mercury cadmium telluride photoconductor. A suitable commercially available model is made by ElectroOptical Systems, Inc., Model MCT10TE1. Other suitable photoconductors may also be appropriate for use in dosimeter reading apparatus made in accordance with this invention.

FIGS. 3 and 3A show that dosimeter readers 9 and 9a also preferably include an emission detection subsystem 350. Emission detection subsystem 350 preferably includes an emission collection means such as reflective emission collector and conduit 351 which is adjacent the dosimeter 330. Although FIGS. 3 and 3A show the dosimeter spaced downwardly for diagrammatic ease of illustration, in preferred arrangements the dosimeter will be positioned close to the collector 351 to increase the sensitivity of the dosimeter reader. Emission collector 351 includes or is immediately adjacent to a specimen opening 352 which allows the stimulating beam to pass to the dosimeter, and allows the emitted energy from the dosimeter to be concentrated and conveyed to a suitable emission detector 355. The emission collector 351 is preferably a reflectively coated along interior surfaces, and advantageously formed as semi-cylindrical conduit with the curved side upward as shown in FIG. 3. The area below the beam splitter 318 is advantageously formed as an ellipsoidal reflector which directs the reflected luminescent emission from the dosimeter longitudinally along the semi-cylindrical collector 351 toward emission detector 355.

Emission detector 355 is advantageously a photomultiplier tube which provides an output signal indicative of the luminescent emission made by dosimeter 330 with time. A variety of suitable photomultipliers are potentially of use in dosimeter readers according to this invention. Other alternative detectors can also be used as needed for the particular type of dosimeter or other radiation sampling device which is being stimulated to emit energy indicative of the level of radiation exposure experienced.

The output from the photomultiplier or other emission detector is preferably output to an emission signal processing and memory unit 52 which can provide signal amplification, digitalization, visual display, and/or transformation into a suitable form of permanent data storage. It is desirable that the output signal with time be carefully recorded in the preferred dosimeter reading apparatus according to this invention. Many, if not all, of the functions of unit 52 can be performed on either a discrete processor unit or using suitable programming and computer 202. If discretely processed the output from unit 52 is communicated to computer 202 for processing or vice versa to allow integration of the stimulation and emission information.

FIGS. 3 and 3A also show that dosimeter reading apparatus 9 and 9a preferably includes a suitable dosimeter holding and positioning means 370. Dosimeter positioner 370 is advantageously an X-Y positioning device constructed to allow automated control of the X and Y positioning coordinates. Positioner 370 includes two Y direction slide bars 372 which allow the Y positioning stage 374 to move back and forth in the Y direction. A suitable Y direction drive is included such as the Y drive 375. Y drive 375 includes a threaded receptacle 376 on the Y positioning stage. A lead screw 377 is threadably received in the receptacle 376. A lead screw motor 378 is mounted to the frame 371 and is used to turn the lead screw thus causing the Y stage to slide on the slide bars 372. Motor 378 is preferably a highly accurate stepper motor. Optionally, an encoder can be incorporated into the motor and used to detect the motor position and produce a feedback position signal indicating the position of the stage.

Dosimeter positioner 370 similarly includes an X positioning stage 380. X positioning stage 380 is slidably mounted on two X direction slide bars 382 which are secured to the Y stage 374 in a manner allowing the motion of X stage 380. The X stage 380 also preferably includes a threaded receptacle 386 which receives a X lead screw 387. A further stepper motor 388 turns lead screw 387 thus driving the X stage in the same manner as the Y stage, except in an orthogonal direction.

The X stage can also advantageously be provided with one or more dosimeter or other sample holding devices 390 to secure the dosimeter in position. The dosimeter positioning means 370 functions as a vertical holder for the dosimeter 330, and is further adapted to include the lateral restraints or holders 390. The lateral dosimeter holders engage the dosimeter applying downward force in a spring clip arrangement which serves to restrain the dosimeter against inadvertent dislodgement. A variety of means for holding the dosimeters are possible, including application of a vacuum to the lower surfaces of the dosimeter through holes in the X stage (not shown).

The dosimeter positioning arrangement and construction allows the dosimeter 330 to be moved relative to the focused laser beam point 16d to heat, optically stimulate, or otherwise stimulate the dosimeter phosphor or other suitable dose storage material. The drive motors 378 and 388 are preferably controlled by computer 202 so that automated movement of the dosimeter positioning device can be accomplished. This allows effective scanning of the dosimeter by the stimulating beam and other types of relative positioning to be accomplished in order to practice the novel methods of this invention as explained more fully hereinafter.

FIG. 4 shows a first dosimeter 330 constructed according to this invention. Dosimeter 330 includes a dosimeter substrate 331 which is preferably made from either thin inorganic or thin organic materials such as glasses or high temperature synthetic resin polymers, for example, polyimide. The dosimeter substrates are preferably approximately 0.1-1 millimeter thick or as discussed in the incorporated reference U.S. patent application Ser. No. 897,992, filed Aug. 19, 1986.

Dosimeter 330 includes a phosphor array 332 which appears continuous in FIG. 4 but is in fact an array of discrete phosphor elements 333 most clearly shown in the detail of FIG. 6. The numerous phosphor elements 333 preferably are of approximately the same size, mass, and type of phosphor or other radiation dose storage material. Suitable types of thermoluminescent phosphors include calcium sulfate doped with dysprosium ($CaSO_4$:Dy) and others. Other phosphors are indicated in U.S. patent application Ser. No. 897,992. Optically suitable luminescent phosphors include calcium, strontium, magnesium and barium sulfides doped with europium and samarium. Others are identified in the incorporated U.S. Pat. No. 507,562. Dosimeters useful in the apparatus and methods of this invention can also include radiophotoluminescent glasses and similar radiophotoluminescent materials. Examples of such materials include silver activated phosphate glasses and others. Also of utility are phosphors which exhibit exoemission, which is the emission of detectable amounts or discharges of electrons from the exoemission phosphor upon stimulation with a laser or other suitable stimulating beam. Examples of suitable exoemission radiation dose detection and storage materials include beryllium oxide. This and other forms of radiation dose detecting and storing materials can also be used in exoemission forms of this invention. Use of exoemission producing dose storing materials will necessarily require suitable emission detection means for the electrons or other emission phenomenon being detected, rather than the optical detector used with luminescent phosphors.

The radiation detecting elements 333 are preferably provided in a thickness "t" which is approximately equal to the range of the particular type of heavy particle or other radiation being detected in the phosphor material. Also of significance is the planar size of the dosimeter elements which are defined to have a first width of "w", and a second width "v". The preferred thicknesses t vary dependent upon the particular dosimeter construction and the type of heavy particle radiation being measured. In preferred dosimeters adapted for measuring proton doses the thicknesses will range from 1–200 microns, more typically 10–100 microns. Even more preferred are phosphor grain or element thicknesses in the range of 30–50 microns inclusive. The desired thickness is dependent upon the rate of transfer of energy from the particle to the phosphor. Thickness should preferably allow nearly all of the heavy particle energy to be dissipated in the available thickness.

The width dimensions w and v can vary substantially since the more relevant parameter is the size of the spot being heated or otherwise stimulated during the reading of the dosimeter. Preferred reading areas are typically defined by laser beams having approximate focused beam spots of 2–200 microns in diameter, or across if the shape is noncircular. More typically the laser beam will be focused to a spot size of 10–100 microns, even more preferably 30–50 microns. The width dimensions w and v and spot size are preferably sufficient to cover a substantial part or all of the radiation affected zone of the phosphor or other detector material. The size of the radiation affected zone depends on the energy level of the heavy particle, the type of particle involved, and the phosphor material used in the dosimeter.

FIG. 5 shows the edge of dosimeter 330 and a superposed optional neutron-to-proton converter 338. Converter 338 is preferably a hydrogenous material providing a ready availability of protons which can be knocked from the atomic and molecular lattice by energetic neutrons. A preferred material is polyethylene, although many other materials are useful in varying degrees of efficiency. The neutron-proton converter 338 is advantageously provided in a efficient thickness "j". The desired thicknesses j for polyethylene with neutron energy levels of 10–1000 keV or higher are approximately 0.1–1 millimeter, more preferably 0.25–1 millimeter. Thicknesses of 0.25–0.5 millimeter are best when less dependence on particle energy level variations is desired. The desired layer thickness j depends in part upon the thickness of converter material from which the protons of varying energy levels can escape. This factor is balanced against the greater conversion efficiency associated with having more available protons for neutron-proton collisions when the converter is made thicker. The converter film or other layer 338 is preferably spaced as close to the dosimeter element as possible, such as from 0–50 millimeters. The combination of dosimeter 330 and converter 338 provides a neutron or other heavy particle dose measuring device.

Similar dose measuring devices may in particular be desirable for other forms of neutral heavy particle radiation to generate heavy charged particles capable of ionizing the dosimeter phosphor or other radiation dose detecting and storage media.

FIG. 5 also shows a further optional element for the dosimeter 330, namely, a radiation filter 399. Filter 399 is generally more effective at eliminating gamma radiation than at eliminating neutral heavy particle radiation. Radiation filter 399 can be a thin film of lead, or combinations of lead, tin, aluminum and/or other suitable materials. A suitable thickness of the filter is approximately 1–10 millimeters, more typically 1–3 millimeters.

Before describing other alternative and preferred dosimeter constructions according to the invention, discussion will now be directed to at least some of the novel methods for reading and measuring heavy particle radiation dose information. Specific reference will now be given to methods used in reading dosimeter 330. Hereinafter additional dosimeter configurations will be described and the novel methods explained in connection with the reading of such alternative dosimeters, to the extent of any variations.

Dosimeter 330 is advantageously used in novel methodologies of this invention to obtain dose exposure information which is capable of selectively measuring heavy particle radiation. The methods measure a first form or characterizing type of radiation, such as heavy particle radiation, in a mixed field or environment having the first type of radiation and a second or background type of radiation which is relatively uniform in the radiation field, such as gamma radiation. Such methods preferably include selecting a suitable phosphor or other radiation dose affected material which is capable of storing the dose information in the form of ionized or otherwise radiation affected regions of the material's molecular and related atomic structures. Preferred and useful materials of such types have been indicated hereinabove for several different types of radiation dose storing phenomenon.

The phosphor or other material is then exposed to the radiation conditions sought to be measured to determine the amount of heavy particle radiation which exists. The duration of exposure can vary dependent upon the types of radiation measured, the dose exposure rate, and the type of phosphor material used. The ionization of the phosphor is substantially an integrating function which stores evidence of the number of protons, alpha particles or other ionizing heavy particle radiation which has impinged upon the phosphor since the previous annealing and release of stored ionized energy.

In the context of dosimeter 330 the dosimeter is exposed to a radiation environment which presumably has both gamma and neutron radiation of significant levels. FIG. 5 diagrammatically shows a neutron 340 which strikes the converter film 338. The rich hydrogenous nature of the preferred polyethylene converter provides a greatly increased potential for having a neutron-proton collision which results in an energetic proton being produced. The energy level of the "knock-on" proton 341 produced by such a collision must be sufficient to emit the proton from the converter and cause the proton to impinge upon the phosphor area 332. Neutrons which do not interact with a proton in the converter 338 merely proceed through the converter and continue on some trajectory. If the trajectory of the neutron causes it to strike on a phosphor area there is only a very small chance that a detectable event will occur because the neutrons are neutral particles which generally do not produce an ionizing effect. The knock-on protons produced also proceed on some trajectory from the converter layer 338. If the proton strikes a phosphor element 333 then the phosphor material is ionized by the passage of the heavy charged particle through the interacting electron orbitals which bind the atoms into molecules. The action of the charged heavy particle is to disturb the orbiting electrons and generate free electrons, delta rays, which radiate through the phosphor material a radiation affected zone approximately 10–100 microns from the path of the neutron as it passes into the phosphor material and is slowed. The protons have a high linear energy transfer in the phosphor material which means there is a relatively rapid dissipation of the proton's energy because of the interaction with the material's electrons. The free electrons or delta rays generated in this ionization process have substantially increased energy because the energy of the proton is being dissipated by exciting the electrons. A portion of the excited electrons become trapped in the phosphor material at relatively higher energy levels which are sufficiently stable at room temperatures to maintain the ionized state for significant periods of time which vary from phosphor to phosphor. The ionized state of the phosphor material caused by these displaced electrons can thus be read by stimulating the phosphor to release the stored ionization energy caused by the energetic proton or other charged heavy particle interaction with the phosphor material.

The knock-on protons produced by collisions in the neutron-proton converter 338 are not highly frequent at normal levels of radiation exposure. For example, if dosimeter 330 has 5,000 dosimeter elements 333, each a little less than 50 microns across, then there is a total area of phosphor elements equal to approximately 0.1 square centimeter. Neutron radiation having average energy level of 1 mega-electron volt (MeV) results in approximately 240 knock-on protons being generated per square centimeter, or approximately 24 knock-on protons for the 0.1 square centimeter area explained for dosimeter 330. This means that there will be approximately 24 heavy particle ionizing events which occur in the phosphor elements 333. These heavy particle ionizing events are randomly positioned across the field of the dosimeter elements. Thus it can be appreciated that only a selected few of the discrete dosimeter elements will be ionized by the incident knock-on protons or other ionizing heavy particle radiation thereby increasing the sample area radiation dosage for those particular elements.

The novel methods of this invention further include reading the dosimeter 330 so as to allow counting or otherwise indicating the number, proportion or other measure of ionizing heavy particle events which have occurred in the phosphor material. In the case of dosimeter 330 this is advantageously accomplished by heating or otherwise stimulating each individual phosphor element 333 and recovering a measure of the luminescent or other emission output from each element. The stimulation of each element of sample area causes an associated release of the ionized energy stored in the material. If the element has experienced an ionizing event, such as due to heavy charged particle interaction, then the signal output from that element will be relatively higher than those elements which have not experienced an ionizing heavy particle event. In normal radiation environment conditions the differences between the emissions for such eventful and non-eventful samples is significant. The number of sample areas experiencing such an ionizing event can be counted and used as a reliable indication of the heavy particle radiation dose. The amount of difference in the signal between eventful and non-eventful sample areas can also be used as a measure, such as explained more fully below.

The methods further include beaming a stimulating beam or otherwise stimulating the phosphor to detect the ionization state at a plurality of sample areas. In the context of dosimeter 330 the X-Y positioning table is moved to position the dosimeter elements or sample areas 333 under the focused laser beam point 16d on an individual basis. The focused laser beam point is approximately the size of the sample area to provide proper stimulation of the entire element. The stimulating laser beam heats or otherwise stimulates the phosphor element 333 causing the phosphor to release energy in a thermoluminescent or other emission at a wavelength different from the stimulating beam or otherwise in a detectable form so that the two forms of light, electromagnetic radiation or other emission can be discriminated and the emission phenomenon be selectively detected from the stimulation. The luminescent or other emission radiates from the phosphor element and a proton of that emission is advantageously collected, such as by the interior reflective walls of the reflector 351. The collected emission is advantageously concentrated by the collector to increase the amount of emission supplied to the photomultiplier 355 or other dosimeter emission detector. The output signal from photomultiplier 355 or other emission detector provides a reliable indication of the level of ionization which existed in the sample area prior to stimulation. This stimulated emission information is used as an indicator of the dose exposure which the dosimeter has experienced.

The novel methods of this invention also preferably involve comparing the stimulated emission information from a plurality of sample areas. Comparing the stimulated emission information provides an average, baseline or other general radiation level measurement basis for deducing appropriate limits for considering whether a sample area has or has not been struck by an ionizing heavy particle. The sample areas can then be discriminated using the sample area emission information to indicate those sample areas which experienced an ionizing heavy particle event (eventful sample areas) from those that did not experience such an event (non-eventful sample areas). The number of heavy particle event sample areas, the relative proportion of heavy particle event sample areas, or other appropriate measure of the relative frequency of ionizing heavy particle events can then be calibrated using known radiation levels and used as a reliable indicator of the amount of heavy particle radiation experienced by the dosimeter.

In general the dosimeters made according to this invention will be used under conditions of radiation exposure where gamma rays or other secondary or background radiation will be present. Many of the phosphor materials useful in this invention will be susceptible to ionization by gamma rays and such exposure shall increase the ionization of the dosimeter sample areas 333. However, the typical radiation field will have such a vast number of gamma rays that the ionization due to gamma radiation will be essentially uniform for all dosimeter sample area, even when the sample areas are relatively small as indicated above. As the amount of gamma radiation increases the difference between the background level of ionization associated with gamma radiation and the relatively more concentrated ionization due to ionizing heavy charged particle events will become more difficult to discriminate. Similarly, with decreasing energy level of the heavy charged particles which cause the sample areas to experience heavy particle events, it also becomes more difficult to discriminate the eventful sample areas. Thus there are limits to the ability of the novel methods of this invention to selectively detect heavy charged particle radiation. However, for the normal ranges of radiation exposure encountered in personnel and environmental dosimetry, the ability to discriminate heavy particle radiation is reliable for measuring heavy particle radiation dose information. Moreover, statistical analysis can be utilized to indicate that even a relatively small difference between the average emission output levels for eventful and non-eventful sample area groups is a significant difference because of the large number of sample areas tested.

It is also significant that the methods and apparatus of this invention allow radiation dose information to be measured for both gamma and heavy particle so long as the types are capable of discrimination. The reading of emission information from the individual sample areas indicates the gamma radiation dose in those sample areas which are properly classified as non-eventful. With the relatively large number of sample areas and the relatively low number of eventful sample areas, this measurement of gamma radiation becomes very accurate. This is true even though some of the sample areas may experience only partial ionization due to incidence of an ionizing heavy particle along the periphery of the sample area. Thus the invention provides measurement of two radiation types in a single dosimeter, and with a single reading operation, which can be automated.

Also important is the ability of methods and dosimeter systems of this invention to indicate the level of energy of the heavy particle radiation which is being measured. The relative level of energy is ascertainable because the sample areas are providing a measured level of emission for substantially each heavy particle event. Thus the stimulated emission signal strength or other measure from the sample areas properly interpreted as eventful sample areas can be compared against the baseline for gamma radiation from non-eventful sample areas. The variable amount of difference is indicative of the degree of ionization due to the incident heavy particle, as some function of heavy particle energy level. Information can thus be calibrated using heavy particle radiation of known energy levels to provide a reliable measure of the heavy particle energy level which ionized the particular sample area. The information from the eventful sample areas can be consolidated to provide a more general measure of heavy particle energy level, if desired.

Figure 8:
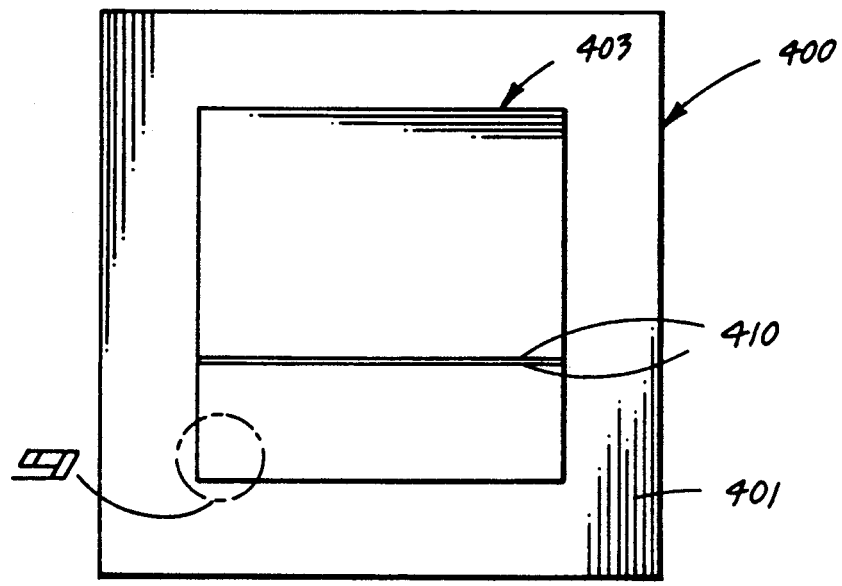
FIG. 8 is a top or plan view of an alternative dosimeter according to this invention.
Figure 9:
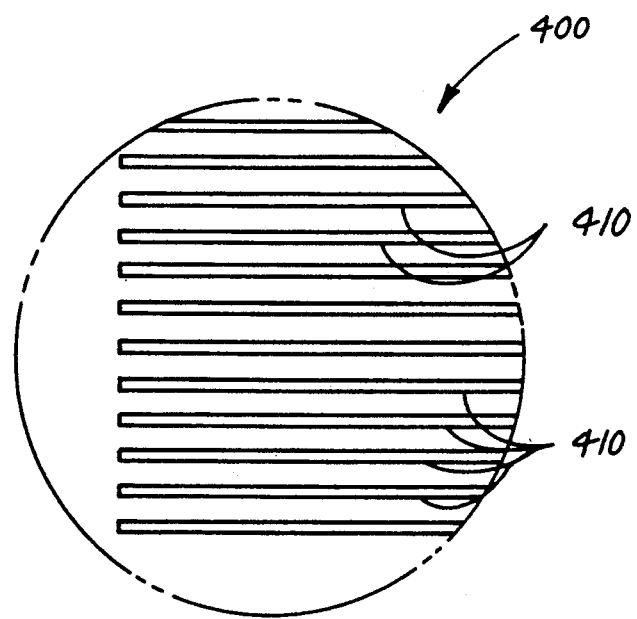
FIG. 9 is a partial enlarged plan view of the dosimeter of FIG. 8 taken substantially at detail circle 9 of FIG. 8.

FIG. 8 shows another form of dosimeter according to this invention. Dosimeter 400 includes a substrate 401 made of a glass, such as described in U.S. patent application Ser. No. 897,992 referenced more fully hereinabove. The dosimeter includes a phosphor field 403 which includes the areas covered with a suitable phosphor, such as a luminescent phosphor. FIG. 9 shows the phosphor field 403 in greater detail. The phosphor field has a plurality of radiation sensitive phosphor stripes 410. The phosphor stripes can be arranged in various geometrical patterns as desired for reading the dose exposure information therefrom. The phosphor or other heavy particle radiation detecting material stripes 410 are preferably of strip width "w" similar in scale to widths v and w used in dosimeter elements 333 discussed above. The stripes 410 also have thicknesses similar to thickness t but not shown specifically in the Figs. The stripes 410 can be of any desired length with approximately 0.1-1 centimeter typical.

Figure 10:
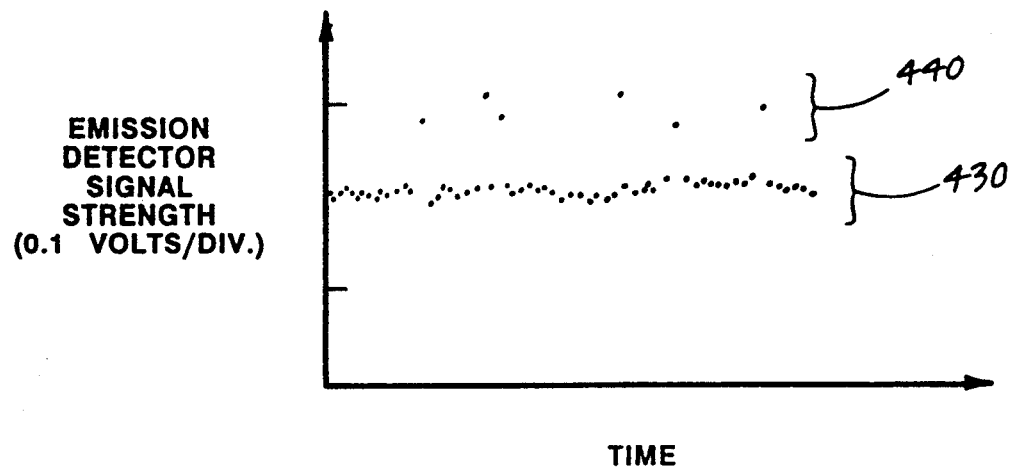
FIG. 10 is a graph showing a hypothetical output signal from reading a dosimeter as shown in FIG. 8.

FIG. 8 shows two stripes 410 drawn in with other stripes omitted for convenience in drawing. FIG. 10 shows a hypothetical graph plotting measurement points along one of the stripes 410. The vertical axis of FIG. 10 shows signal strength of the emission detector 355. The horizontal axis of that Fig. shows the scan time and the emission associated with various positions along the stripe. Such information is generated by scanning a stimulating beam, such as laser beam 16 along the continuous stripe 410 with time. As indicated the majority of the sample areas produced emission information indicating that no ionizing heavy particle event had occurred. These are indicated by the data points in the lower band 430 of FIG. 10. An upper hand 440 shows 6 data points indicative of sample areas which displayed a significantly higher degree of emission. Such data points indicate that eventful sample areas were detected as the laser beam scanned across the dosimeter stripe 410. The number of eventful sample areas can be used to interpret the dosimeter to derive and obtain a measure of the amount of heavy particle radiation to which the dosimeter was exposed.

The data shown in FIG. 10 can also be used to interpret the level of energy associated with the heavy particles causing the ionization of the dosimeter phosphor. The difference between each data point in band 440 can be either individually analyzed or the height of the band relative to band 430 can be measured and an indication of the energy level of the heavy particles detected. Also the general height of the data points in band 430 can be associated with gamma radiation and a measure of gamma dose derived.

Figure 11:
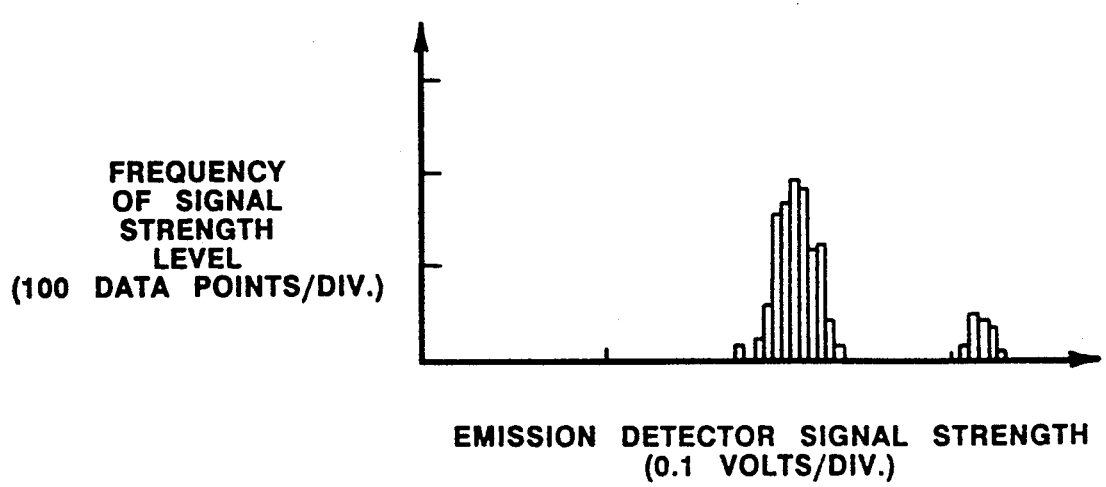
FIG. 11 is a histogram showing the frequencies of dosimeter output signal levels for the output signal scan shown in FIG. 10.

FIG. 11 shows a diagram generated from FIG. 10 showing the frequency of certain signal strength measurements taken for the data points of FIG. 10. The histogram shows clear clustering of the data points about the two different levels of emission information. This information can similarly be used for interpreting dose exposure for the dosimeter.

Figure 12:
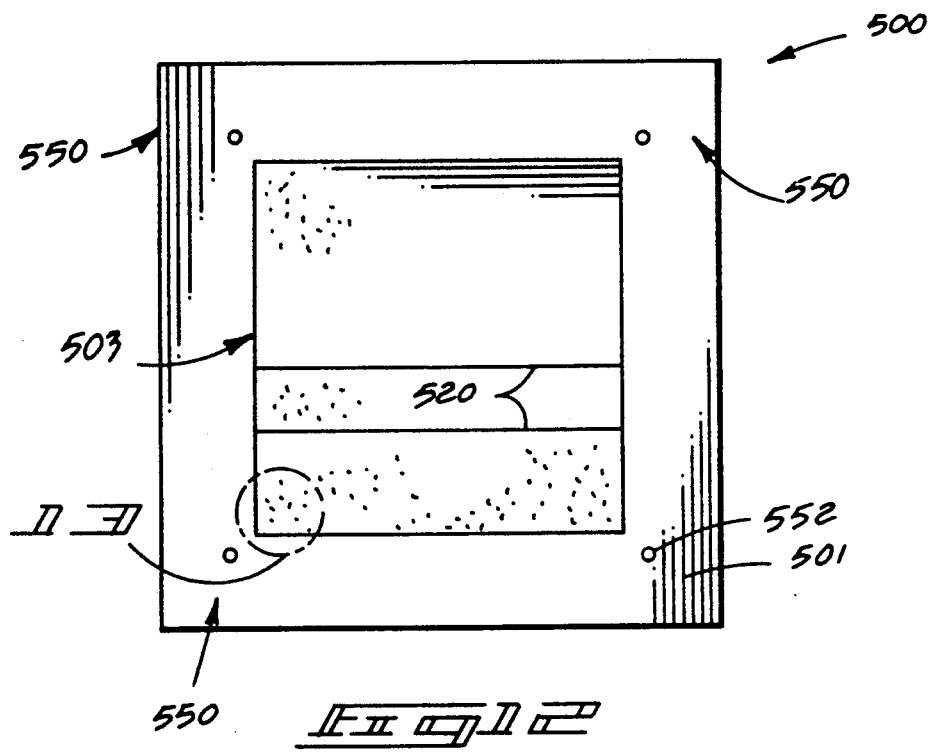
FIG. 12 is a top or plan view of a further alternative dosimeter according to this invention.
Figure 13:
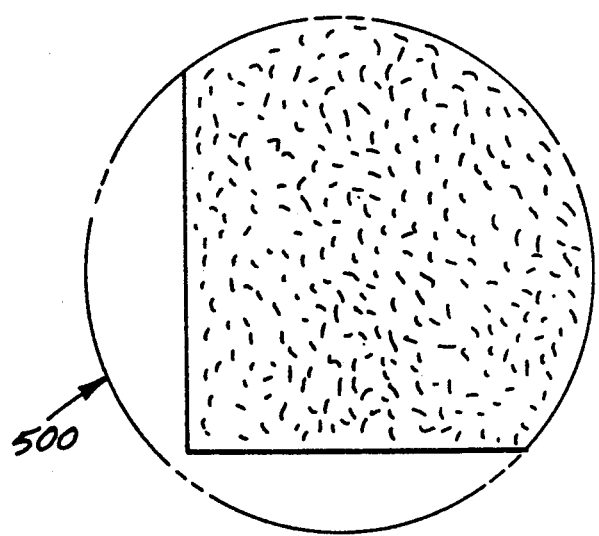
FIG. 13 is a partial enlarged plan view of the dosimeter of FIG. 12 taken substantially at detail circle 13 of FIG. 12.

FIG. 12 shows a further dosimeter 500 useful in this invention. Dosimeter 500 includes a thin layer substrate 501, such as described above in connection with dosimeter 400. The substrate is preferably a synthetic resin polymer (polyimide) which does not absorb the stimulating beam to the degree possible. A phosphor area or field 503 is applied to one side of the substrate, preferably upon a reflective metallic coating, such as aluminum, applied to one side of the substrate. The phosphor area is continuous and not arranged into discrete elements or stripes as indicated by FIG. 13. FIG. 12 shows two scan paths 520 which are defined by the impingement of a stimulating laser or other beam onto the phosphor, such as by moving the X position stage of the X-Y positioner of FIG. 3. As the dosimeter is moved thereon relative to the beam, the beam scans across the phosphor field causing stimulation of the phosphor to release a scan of emission readings which are recorded in memory or otherwise, and coordinately recorded with information about the position of the beam on the phosphor to facilitate interpretation of the data obtained. The continuous phosphor area is scanned repeatedly in linear scans which are substantially continuous and repeated to read numerous times across or down the dosimeter. The scanning of dosimeter 500 will produce data substantially the same as shown in FIG. 10 and described above. Such data is interpreted similarly for each of the numerous scans to develop emission information for a large number of sample areas stimulated during the reading operation.

FIG. 12 shows an alignment means feature which is advantageously incorporated into dosimeters according to this invention, and although not specifically shown in other embodiments such can clearly be incorporated thereinto. The alignment means included in dosimeter 500 is embodied as one or more sets of alignment markings 550. Alignment marking sets 550 include at least one and preferably two or more alignment marks 552. Alignment marks 552 can advantageously be formed by applying a mixture of non-reflective material such as carbon and a suitable binder or adhesive in the desired shape and orientation to the exposed surfaces of dosimeter 500. As shown, alignment marks 552 are a combined polyimide and carbon mixture applied to the dosimeter.

The alignment system works as indicated in FIG. 14 by scanning the laser beam 16 over the surface of the marginal portions of the dosimeter to accurately determine the coordinates at which the laser beam is incident upon the alignment marks because of incandescence or differing reflectance from the marks 552 which can be sensed using the photomultiplier 355 or other suitable detector depending upon the reflectance properties of the alignment marking material. Once the position and angular orientation of the dosimeter is known the necessary X-Y positioner motion can be reconfigured for the particular dosimeter placement by suitable computer programming to achieve the desired beam scanning path.

FIG. 15 shows dosimeter 400 with a strip of phosphor being read along a staggered stimulating beam impingement path 490. The staggered path is used because the dosimeter stripes 410 are not precisely aligned to the relative motion between the laser beam and the dosimeter support. Alternatively, an adjustable rotational frame (not shown) can be incorporated into the dosimeter support or otherwise incorporated to allow relative angular motion between the laser beam path and the dosimeter.

FIGS. 16 and 17 show a preferred dosimeter and dosimeter holder useful in practicing this invention. Dosimeter holder 600 is adapted for use in measuring radon gas concentrations, such as in buildings and homes. The dosimeter holder includes a first or upper frame half 602 and a second lower frame half 603. The lower frame advantageously includes a hemispherical diffusion chamber 605 formed integrally therein. Peripheral walls 607 extend about the lower frame piece to support the dosimeter holder on a supporting surface, such as a counter, floor or other surface within the environment being monitored for radon gas concentration. The peripheral walls advantageously have openings 606 formed therein for ventilation below the diffusion chamber wall 605a.

The upper frame piece 602 is adapted to fit upon the lower frame piece, such as by engagement of the mating exterior threads 608 and interior threads 609 formed on the lower and upper frame pieces, respectively. The upper frame piece includes a series of suitably formed openings 620 to allow airflow into and out of the diffusion chamber 605.

Dosimeter holder 600 also includes a third frame part or dosimeter support 630 which is interposed between the upper and lower frame parts. Dosimeter support piece 630 includes a central dosimeter aperture 631 which exposes the phosphor face 641 of the dosimeter 640 downwardly toward the diffusion chamber. Dosimeter 640 is constructed similar to dosimeter 500 described above using the phosphor calcium sulfate doped with dysprosium ($CaSO_4$:Dy) or doped with thulium ($CaSO_4$:Tm). The phosphor layer has a thickness t of approximately 20 microns or greater. The particles or grains used to make the dosimeter advantageously have approximate size of 20–100 microns as determined by carefully screening the phosphor material to achieve grains within this range. The dosimeter elements or grains are applied to the substrate as explained in greater detail below. A filter 645 is advantageously included between the dosimeter support 630 and upper frame piece 620 for excluding dust from the diffusion chamber and dosimeter 640.

The dosimeter 640 is read using the dosimeter reader 9 described above. Each dosimeter element is read by heating with a focused laser spot, such as having a beam diameter of approximately 50–100 microns. The number of elements experiencing a heavy particle event caused by incidence of a positively charged alpha particle is determined by comparing the baseline radiation level of non-event sample areas against relatively higher emission strengths associated with the eventful sample areas.

Dosimeter made according to this invention can be constructed using the novel processes disclosed in applicants' prior U.S. patent application Ser. No. 897,992, in particular at pages 18–33. The processes basically involve using a screen or fine overlay having performed apertures of sizes corresponding to the desired sizes of the dosimeter elements which are to be formed on the relatively thin dosimeter substrate. The screen apertures are arranged in a desired array formation, such as a rectilinear array suitable for forming an array of dosimeter elements as shown in FIG. 6. The phosphor grains used to fabricate the dosimeter are preferably carefully graded according to size to achieve grain sizes which approximately match the size of the screen apertures. The screen is aligned over the substrate in a desired position and orientation to form the dosimeter elements upon the substrate. A mixture of a suitable vehicle, binder and the size-graded phosphor grains is then prepared and applied as a paste to the substrate surface by forcing the mixture through the apertures in the overlying screen. Approximately 1 grain is forced through each of the screen apertures when individual discrete elements are formed, thereby achieving relatively uniform elements upon the dosimeter substrate surface. The dosimeter is then allowed to dry and thereafter is baked or otherwise treated to fuse the phosphor and binder together in fixed position upon the dosimeter substrate.

Dosimeters according to this invention can be fabricated as indicated above using either inorganic substrates, such as glasses, ceramics and metals, or using organic materials such as high temperature synthetic resin polymers. The binder, vehicle and phosphor mixture used in resin applications will typically include an adhesive component which adheres the phosphor grains to the substrate without requiring a subsequent heating to fuse the binder and phosphor to the substrate.

This invention can also be used to measure relatively slow or lower energy heavy particles as well as relatively higher energy heavy particles. One manner of effectuating the measurement of relatively slow or lower energy particles utilizes the albedo effect. The albedo effect involves the generation of alpha particles from the collision of a relatively slow particle;, particularly a slow neutron; with the nucleus of an albedo material. The nuclear fission which results from this collision generates the alpha particle which is detected as described elsewhere in this document. Albedo dosimetry can advantageously be performed using this invention by incorporating a suitable form of albedo conversion means into the dosimeter. The albedo conversion means can be incorporated in the form of a distinct converter layer, such as in substitution for or addition to the converter layer 338 shown in FIG. 5. More preferably, the albedo converter means is accomplished by adding a desired albedo ingredient into the phosphor used in making the radiation detector material formed into the discrete spots, stripes or relatively large layer, such as described hereinabove. Alternatively, the albedod ingredient can be one of the constituents of the phosphor material itself. The albedo ingredient is advantageously the lithium-6 isotope of that element, or the boron-10 isotope of the element boron. Either of these albedo ingredients or other equivalents can be admixed into the phosphor material used to form the sample areas. Alternatively, the phosphor materials can be formulated to include lithium or boron, and the lithium or boron used in the sample areas can be lithium-6 or boron-10. For example, the phosphor $MgB_4O_7:Tm$ can be used as a thermoluminescent phosphor in this invention. The boron used can be either exclusively or partially supplied as boron-10. A further example is a desirable phosphor material containing an admixture of $CaSO_4:Tm$ and LiF. The lithium of the LiF can be supplied as either lithium-6 in order to provide albedo sensitivity to slow neutrons, or lithium-7 to have little sensitivity to slow neutrons.

The invention further includes dosimeter arrangements which include sample areas having an albedo ingredient and a related dosimeter or other collection of sample areas which are formed without the albedo ingredient or otherwise with a differing albedo effect sensitivity. This configuration allows increased information concerning dose response to be derived from the differing response characteristics of preferably similar dosimeters having differing albedo response characteristics. For example, one dosimeter having sample areas with an albedo ingredient and the other dosimeter not displaying significant albedo response.

The albedo effect is furthermore complementary to non-albedo dosimeters because an albedo dosimeter as explained herein has decreasing response with increasing energy of the neutrons or other applicable heavy particle radiation. This decreasing response relationship is caused by the decreasing probability that the alpha particle generating fission reaction will occur as the energy of the neutron increases above 1 eV. The response of dosimeters of this invention which do not incorporate an albedo ingredient is opposite, namely, an increasing response with increasing energy of the neutrons or other applicable heavy particle. These complementary energy response characteristics allow the overall detection capability of dosimeters according to this invention to be increasing by including dosimeter sample areas of both types in a dosimeter assembly or badge.

It should further be noted that the albedo effect dosimetry contemplated by this invention may further be used to measure fast neutrons or other applicable heavy particles by including a suitable moderator which converts or otherwise slows fast neutrons into slow neutrons, or other applicable particles. One suitable moderator is a human body for which dose measurements are being made. The albedo dosimeter is shielded from ambient radiation using a suitable radiation shield, except for a sample opening which is directed toward the human body. Fast neutrons striking the human body generate a certain number of slow neutrons which are then detected according to the albedo effect dosimetry discussed above. Other forms of moderating devices can alternatively be employed for a similar purpose.

In compliance with the statute, the invention has been described in language more or less specific as to structural features. It is to be understood, however, that the invention is not limited to the specific features shown, since the means and constructed herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A method for reading dose exposure information from a radiation dosimeter to obtain a measurement of the amount of heavy particle radiation to which the dosimeter has been exposed, comprising:

beaming a stimulating beam onto a plurality of sample areas of the dosimeter to cause emission discharges from said sample areas; said emission discharges being variable amongst the sample areas with respect to at least one emission characteristic which is indicative of a sample area radiation dosage experienced by a particular sample area;

measuring the emission discharges from a plurality of said sample areas to produce sample area emission information;

comparing the sample area emission information from a plurality of sample areas;

deducing an approximate indication of eventful sample areas which are those sample areas which exhibited an eventful emission discharge caused by incidence of at least one heavy particle upon the eventful sample area in an ionizing heavy particle event; and deriving from the indication of eventful sample areas, at least one measurement indicative of the approximate level of radiation exposure experienced by the dosimeter which was caused by heavy particle radiation.

2. A method according to claim 1 wherein the stimulating beam is a laser beam.

3. A method according to claim 1 wherein the heavy particle radiation being measured is radiation from charged heavy particles.

4. A method according to claim 1 wherein the heavy particle radiation is associated with neutral heavy particles and the method further comprises converting neutral heavy particles of said heavy particle radiation into changed heavy particles which impinge upon and ionize the dosimeter.

5. A method according to claim 1 wherein said beaming is accomplished with a laser beam and laser beam exposure period which cause substantial thermal heating, and said emission discharges are thermoluminescent discharges.

6. A method according to claim 1 wherein said beaming is accomplished with a laser beam and laser beam exposure period which do not cause substantial heating of the luminescent sample areas.

7. A method according to claim 1 wherein said beaming is accomplished with a laser beam and laser beam exposure period which perform optically stimulated luminescent emission discharges in periods of less than 100 milliseconds.

8. A method according to claim 1 wherein the emission discharges are exoemission discharges of electrons from the dosimeter.

9. A method according to claim 1 wherein the emission discharges are radiophotoluminescent discharges from the dosimeter.

10. A method for reading dose exposure information from a luminescent dosimeter to obtain a measurement of the amount of heavy particle radiation to which the dosimeter has been exposed, comprising:
  beaming a laser beam onto a plurality of luminescent sample areas of the dosimeter to cause luminescent discharges from said sample areas;
  measuring the luminescent discharges from a plurality of said sample areas to produce sample area luminescence information which is indicative of at least one characteristic of the luminescent discharges from various sample areas of the dosimeter;
  comparing the sample area luminescence information from a plurality of luminescent sample areas;
  deducing an approximate indication of eventful luminescent sample areas which exhibited eventful luminescence caused by incidence of at least one heavy particle upon an eventful luminescent sample area in an ionizing heavy particle event; and,
  deriving from the indication of eventful luminescent sample areas, at least one measurement indicative of the approximate level of radiation exposure experienced by the dosimeter which was caused by heavy particle radiation.

11. A method according to claim 10 wherein said comparing the sample area luminescence information includes deriving at least one general radiation level measurement and comparing sample area luminescence information thereto to derive an indication of luminescent sample areas which exhibited eventful luminescence.

12. A method according to claim 10 wherein the heavy particle radiation being measured is radiation from charged heavy particles.

13. A method according to claim 10 wherein said beaming is accomplished with a laser beam and laser beam exposure period which cause substantial thermal heating, and said luminescent discharges are thermoluminescent discharges.

14. A method according to claim 10 wherein the heavy particle radiation is associated with neutral heavy particles and the method further comprises converting neutral heavy particles of said heavy particle radiation into charged heavy particles which impinge upon and ionize the dosimeter.

15. A method according to claim 10 wherein said beaming is accomplished with a laser beam and laser beam exposure period which do not cause substantial heating of the luminescent sample areas.

16. A method according to claim 10 wherein said beaming is accomplished with a laser beam and laser beam exposure period which perform optically stimulated luminescent emissions in periods of less than 100 milliseconds.

17. A method according to claim 10 wherein said beaming is accomplished with a laser beam having a frequency in the visible or infrared regions of the electromagnetic spectrum.

18. A method according to claim 10 wherein said beaming is accomplished with a laser beam having a frequency in the ultraviolet region of the electromagnetic spectrum.

19. A method according to claim 10 wherein said heavy particle radiation and said ionizing heavy particle event are cause by protons and the method is for measuring proton radiation.

20. A method according to claim 10 wherein said heavy particle radiation and said ionizing heavy particle event are caused by alpha particles and the method is for measuring alpha particle radiation.

21. A method according to claim 10 wherein said heavy particle radiation and said ionizing heavy particle even are caused by protons emitted from a radiation converter positioned adjacent the dosimeter during exposure to said ionizing heavy particle radiation.

22. A method according to claim 10 wherein said heavy particle radiation and said ionizing heavy particle event are caused by charged heavy particle radiation emitted from a radiation converter positioned adjacent the dosimeter during exposure to said ionizing heavy particle radiation.

23. A method according to claim 10 wherein said beaming occurs upon discretely spaced luminescent sample area.

24. A method according to claim 23 wherein said beaming occurs upon luminescent sample area formed as spaced discrete units of phosphor material on dosimeter.

25. A method according to claim 10 wherein said beaming is accomplished by scanning the laser beam across the dosimeter.

26. A method according to claim 10 wherein said beaming is accomplished by scanning the laser beam across the dosimeter in a substantially continuous manner.

27. A method according to claim 10 wherein said beaming is onto a plurality of approximately equally sized, discrete luminescent sample areas formed on the dosimeter.

28. A method for reading dose exposure information from a luminescent dosimeter to obtain a measurement of the amount of ionizing heavy particle radiation to which the dosimeter has been exposed, comprising:
  beaming a laser beam onto a plurality of luminescent sample area of the dosimeter to cause luminescent discharges from said samples areas;
  measuring the luminescent discharges from a plurality of said sample areas to produce sample area luminescent information which is indicative of at least one characteristic of the luminescent discharges from various sample areas of the dosimeter;
  comparing the sample area luminescence information from a plurality of luminescent sample area to provide an indication of eventful luminescent sample areas which exhibited eventful luminescent associated with those sample areas ionized by at least one heavy particle in an ionizing heavy particle event; and, deriving from the indication of eventful luminescent sample areas at least one measurement indicative of the approximate level of radiation exposure experienced by the dosimeter which was caused by heavy particle radiation.

29. A method for reading neutron dose exposure information from a luminescent dosimeter to obtain a measurement of the amount of neutron radiation to which the dosimeter has been exposed, comprising:

beaming a laser beam onto a plurality of luminescent sample areas of the dosimeter to cause luminescent discharges from said sample areas;

measuring the luminescent discharges from a plurality of said sample areas to produce sample area luminescence information which is indicative of at least one characteristic of the luminescent discharges from various sample area of the dosimeter;

comparing the sample area luminescence information from a plurality of luminescent sample areas;

deducing an approximate indication of the eventful luminescent sample areas which exhibited eventful luminescence caused by incidence of at least one heavy particle upon an eventful luminescent sample area in an ionizing heavy particle event; and, deriving from the indication of eventful luminescent sample areas, at least one measurement indicative of the approximate level of radiation exposure experienced by the dosimeter which was caused by heavy particle radiation.

30. A method for reading alpha particle dose exposure information from a luminescent dosimeter to obtain a measurement of the amount of alpha particle radiation to which the dosimeter has been exposed, comprising:

beaming a laser beam onto a plurality of luminescent sample areas of the dosimeter to cause luminescent discharges from said samples areas;

measuring the luminescent discharges from a plurality of said sample areas to produce sample area luminescence information which is indicative of at least one characteristic of the luminescent discharges from various sample areas of the dosimeter;

comparing the sample area luminescence information from a plurality of luminescent sample area;

deducing an approximate indication of the eventful luminescent sample areas which exhibited eventful luminescence caused by incidence of at least one heavy particle upon on eventful luminescent sample area in an ionizing heavy particle event; and, deriving from the indication of eventful luminescent sample areas, at least one measurement indicative of the approximate level of radiation exposure experienced by the dosimeter which was caused by heavy particle radiation.

31. Methodology for collecting and reading dose exposure information using a radiation dosimeter to obtain measurement of the amount of heavy particle radiation to which the dosimeter has been exposed, comprising:

selecting a radiation dosimeter having at least portions thereof which are capable of variably changing in response to exposure to variable amounts of heavy particle radiation;

exposing the dosimeter to radiation conditions for which radiation dose information is desired;

stimulating a plurality of sample area of the dosimeter to cause emission discharges from said sample areas, said emission discharges being variable amongst the sample areas with respect to at least one emission characteristic which is indicative of a sample area radiation dosage experienced by a particular sample area;

measuring the emission discharges from a plurality of sample areas to produce sample area emission information;

analyzing the emission discharges from a plurality of sample areas to obtain an approximate indication of eventful sample areas which experienced at least one heavy particle event; and deriving from the indication of eventful sample areas; at least one measurement indicative of the approximate level of radiation exposure experienced by the dosimeter which was caused by heavy particle radiation.

32. Methodology for collecting and reading dose exposure information using a radiation dosimeter to obtain measurement of the amount of heavy particle radiation to which the dosimeter has been exposed, comprising:

selecting a radiation dosimeter having at least portions thereof which are capable of variably changing in response to exposure to variable amounts of heavy particle radiation;

exposing the dosimeter to radiation conditions for which radiation dose information is desired;

stimulating a plurality of sample areas of the dosimeter to cause emission discharges from said sample area; said emission discharges being variable amongst the sample area with respect to at least one emission characteristic which is indicative of a sample area radiation dosage experienced by a particular sample area;

measuring the emission discharges from a plurality of sample areas to produce sample area emission information;

analyzing the emission discharges from a plurality of sample areas to identify a limited portion of the sample areas which experienced a heavy particle radiation event; and obtaining an approximate indication of the level of radiation exposure experienced by the dosimeter which was caused by heavy particle radiation.

33. Methodology for collecting and reading dose exposure information according to claim 32 wherein the radiation is ionizing radiation.

34. Methodology for collecting and reading dose exposure information according to claim 32 wherein the radiation is heavy particle radiation.

35. Methodology for collecting and reading dose exposure information according to claim 32 wherein the radiation is ionizing heavy particle radiation.

36. Methodology for collecting and reading dose exposure information according to claim 32 wherein the radiation is alpha particle radiation.

37. Methodology for collecting and reading dose exposure information according to claim 32 wherein the radiation is neuron radiation, and further comprising converting neutron radiation during said exposing into proton radiation at least a part of which is incident upon sample areas of the dosimeter.

38. Methodology for collecting and reading dose exposure information according to claim 32 and further comprising filtering to reduce the incidence of at least a second form of radiation onto the dosimeter during said exposing, to thereby improve the resolution of eventful luminescent sample areas.

39. Methodology for collecting and reading dose exposure information according to claim 32 wherein said stimulating is by beaming a laser beam onto sample areas of the dosimeter.

40. Methodology for collecting and reading dose exposure information according to claim 32 wherein said stimulating occurs to discretely spaced sample areas on the dosimeter.

41. Methodology for collecting and reading dose exposure information according to claim 32 wherein said stimulating involves scanning a laser beam across sample areas on the dosimeter.

42. Methodology for collecting and reading dose exposure information using a luminescent dosimeter to obtain measurement of the amount of heavy particle radiation to which the dosimeter has been exposed, comprising:
   selecting a laser readable luminescent dosimeter;
   exposing the dosimeter to radiation conditions for which radiation dose information is desired;
   beaming a laser beam onto a plurality of luminescent sample areas of the dosimeter to cause luminescent discharges from said sample areas;
   measuring the luminescent discharges from a plurality of said sample areas to produce sample area luminescence information which is indicative of at least one characteristic of the luminescent discharges from various sample areas of the dosimeter;
   comparing the sample area luminescence information from a plurality of luminescent sample areas;
   deducing an approximate indication of the eventful luminescent sample areas which exhibited eventful luminescence caused by incidence of at least one heavy particle upon an eventful luminescent sample area in an ionizing heavy particle event; and,
   deriving from the indication of eventful luminescent sample areas, at least one measurement indicative of the approximate level of radiation exposure experienced by the dosimeter which was caused by heavy particle radiation.

43. Methodology for collecting and reading dose exposure information according to claim 42, and further comprising:
   converting heavy particle radiation during said exposing into charged heavy particle radiation at least a part of which is incident upon luminescent sample areas of the dosimeter.

44. Methodology for collecting and reading dose exposure information according to claim 42, and further comprising:
   converting substantially neutral heavy particle radiation during said exposing into charged heavy particle radiation at least a part of which is incident upon luminescent sample areas of the dosimeter.

45. Methodology for collecting and reading dose exposure information according to claim 42, and further comprising:
   converting substantially neutral heavy particle radiation during said exposing into charged heavy particle radiation at least a part of which is incident upon luminescent sample areas of the dosimeter.

46. Methodology for collecting and reading dose exposure information according to claim 42, and further comprising:
   converting neutron radiation during said exposing into proton radiation at least a part of which is incident upon luminescent sample areas of the dosimeter.

47. Methodology for collecting and reading dose exposure information according to claim 42, and further comprising:
   filtering to reduce the incidence of at least one form of radiation onto the dosimeter during said exposing, to thereby improve the resolution of eventful luminescent sample areas.

48. Methodology for collecting and reading dose exposure information according to claim 42, and further comprising:
   filtering to reduce the incidence of at least one form of radiation onto the dosimeter during said exposing, to thereby improve the resolution of eventful luminescent sample areas; and
   converting heavy particle radiation during said exposing into charged heavy particle radiation at least a part of which is incident upon luminescent sample areas of the dosimeter.

49. Methodology for collecting and reading dose exposure information according to claim 42 and further comprising:
   filtering to reduce the incidence of at least one form of radiation onto the dosimeter during said exposing to thereby improve the resolution of eventful luminescent sample areas; and
   converting substantially neutral heavy particle radiation during said exposing into charged heavy particle radiation at least a part of which is incident upon luminescent sample areas of the dosimeter.

50. Methodology for collecting and reading dose exposure information according to claim 42 wherein said comparing the sample area luminescence information includes deriving at least one general radiation level measurement and comparing sample area luminescence information thereto to derive an indication of luminescent sample areas which exhibited eventful luminescence.

51. Methodology for collecting and reading dose exposure information according to claim 42 wherein the heavy particle radiation being measured is radiation from charged heavy particles.

52. Methodology for collecting and reading dose exposure information according to claim 42 wherein said beaming is accomplished with a laser beam and laser beam exposure period which cause substantial thermal heating, and said luminescent discharges are thermoluminescent discharges.

53. Methodology for collecting and reading dose exposure information according to claim 42 wherein said beaming is accomplished with a laser beam and laser beam exposure period which do not cause substantial heating of the luminescent sample areas.

54. Methodology for collecting and reading dose exposure information according to claim 42 wherein said beaming is accomplished with a laser beam and laser beam exposure period which perform optically stimulated luminescent emissions in periods of less than 100 milliseconds.

55. Methodology for collecting and reading dose exposure information according to claim 42 wherein said beaming is accomplished with a laser beam having a frequency in the visible or infrared regions of the electromagnetic spectrum.

56. Methodology for collecting and reading dose exposure information according to claim 42 wherein said beaming is accomplished with a laser beam having a frequency in the ultraviolet region of the electromagnetic spectrum.

57. Methodology for collecting and reading dose exposure information according to claim 42 wherein said heavy particle radiation and said ionizing heavy particle event are caused by protons and the method is for measuring proton radiation.

58. Methodology for collecting and reading dose exposure information according to claim 42 wherein said heavy particle radiation and said ionizing heavy particle event are caused by alpha particles and the method is for measuring alpha particle radiation.

59. Methodology for collecting and reading dose exposure information according to claim 42 wherein said heavy particle radiation and said ionizing heavy particle event are caused by protons emitted from a radiation converter positioned adjacent the dosimeter during exposure to said ionizing heavy particle radiation.

60. Methodology for collecting and reading dose exposure information according to claim 42 wherein said heavy particle radiation and said ionizing heavy particle event are caused by charged heavy particle radiation emitted from a radiation converter positioned adjacent the dosimeter during exposure to said ionizing heavy particle radiation.

61. Methodology for collecting and reading dose exposure information according to claim 42 wherein said beaming occurs upon discretely spaced luminescent sample areas.

62. Methodology for collecting and reading dose exposure information according to claim 42 wherein said beaming occurs upon luminescent sample areas formed as spaced stripes of phosphor material on the dosimeter.

63. Methodology for collecting and reading dose exposure information according to claim 42 wherein said beaming is accomplished by scanning the laser beam across the dosimeter.

64. Methodology for collecting and reading dose exposure information according to claim 42 wherein said beaming is accomplished by scanning the laser beam across the dosimeter in a substantially continuous manner a plurality of times.

65. Methodology for collecting and reading dose exposure information according to claim 42 wherein said beaming is onto a plurality of approximately equally sized, discrete luminescent sample areas formed on the dosimeter.

66. Methodology for collecting and reading neutron dose exposure information using a luminescent dosimeter, to obtain measurement of the amount of neutron radiation to which the dosimeter has been exposed, comprising:
  selecting a laser readable luminescent dosimeter;
  exposing the dosimeter to radiation conditions for which neutron radiation dose information is desired;
  converting neutron radiation during said exposing into charged heavy particle radiation at least a part of which is incident upon luminescent sample areas of the dosimeter;
  beaming a laser beam onto a plurality of luminescent sample areas of the dosimeter to cause luminescent discharges from said sample areas;
  measuring the luminescent discharges from a plurality of said sample areas to produce sample area luminescence information which is indicative of at least one characteristic of the luminescent discharges from various sample areas of the dosimeter;
  comparing the sample area luminescence information from a plurality of luminescent sample area;
  deducing an approximate indication of the eventful luminescent sample areas which exhibited eventful luminescence caused by incidence of at least one charged heavy particle upon an eventful luminescent sample area in an ionizing heavy particle event; and,
  deriving from the indication of eventful luminescent sample areas, at least one measurement indicative of the approximate level of neutron radiation exposure experienced by the dosimeter.

67. The methodology for collecting and reading neutron dose exposure information according to claim 66 and further defined by converting neutron radiation during said exposing into proton radiation at least a part of which is incident upon luminescent sample areas of the dosimeter.

68. The methodology for collecting and reading dose exposure information according to claim 67 and further comprising:
  filtering to reduce the incidence of at least one form of radiation onto the dosimeter during said exposing to thereby improve the resolution of eventful luminescent sample areas.

69. The methodology for collecting and reading dose exposure information according to claim 68 wherein the filtering is effective at reducing the levels of gamma radiation incident upon the luminescent sample areas.

70. Methodology for collecting and reading alpha particle radiation dose exposure information using a luminescent dosimeter, to obtain measurement of the amount of alpha particle radiation to which the dosimeter has been exposed, comprising:
  selecting a laser readable luminescent dosimeter;
  exposing the dosimeter to radiation conditions for which alpha particle radiation dose information is desired;
  beaming a laser beam onto a plurality of luminescent sample areas of the dosimeter to cause luminescent discharges from said sample areas;
  measuring the luminescent discharges from a plurality of said sample areas to produce sample area luminescence information which is indicative of at least one characteristic of the luminescent discharges from various sample areas of the dosimeter;
  comparing the sample area luminescence information from a plurality of luminescent sample areas;
  deducing an approximate indication of the eventful luminescent sample areas which exhibited eventful luminescence caused by incidence of at least one charged heavy particle upon an eventful luminescent sample area in an ionizing heavy particle event; and,
  deriving from the indication of eventful luminescent sample areas, at least one measurement indicative of the approximate level of alpha particle radiation exposure experienced by the dosimeter.

71. The methodology for collecting and reading alpha particle radiation dose exposure information according to claim 70 and further comprising:

filtering to reduce the incidence of at least one form of radiation onto the dosimeter during said exposing, to thereby improve the resolution of eventful luminescent sample areas.

72. The methodology for collecting and reading alpha particle radiation dose exposure information according to claim 71 wherein the filtering is effective at reducing the levels of gamma radiation incident upon the luminescent sample areas.

73. The methodology for collecting and reading alpha particle radiation dose exposure information according to claim 70 wherein said beaming is accomplished with a laser beam and laser beam exposure period which cause substantial thermal heating, and said luminescent discharges are thermoluminescent discharges.

74. The methodology for collecting and reading alpha particle radiation dose exposure information according to claim 70 wherein said beaming is accomplished with a laser beam and laser beam exposure period which do not cause substantial heating of the luminescent sample areas.

75. The methodology for collecting and reading alpha particle radiation dose exposure information according to claim 70 wherein said beaming is accomplished with a laser beam and laser beam exposure period with perform optically stimulated luminescent emissions in periods of less than 100 milliseconds.

76. A method for selectively measuring integrated radiation dosage of a first type of radiation in a mixed radiation environment including radiation from said first type of radiation and from at least a second type or radiation, comprising:

selecting a radiation dosimeter having at least portions thereof which are capable of variably changing in response to exposure to variable amounts of said first type of radiation;

exposing the dosimeter to condition for which radiation dose information is desired;

stimulating a plurality of sample areas of the dosimeter to cause emission discharges from said sample areas; said emission discharges being variable amongst the sample areas with respect to at least one emission characteristic which is indicative of a sample area radiation dosage experienced by a particular sample area due to said first type of radiation;

measuring the emission discharges from a plurality of sample areas to produce sample area emission information;

analyzing the emission discharges from a plurality of sample areas to obtain an approximate indication of eventful sample areas which experienced at least one radiation event caused by said first type of radiation; and obtaining an approximate indication of the level of radiation exposure experienced by the dosimeter caused by said first type of radiation.

* * * * *